United States Patent [19]
Suzuki

[11] Patent Number: 5,862,121
[45] Date of Patent: Jan. 19, 1999

[54] DOUBLE-LAYERED INFORMATION RECORDING MEDIUM HAVING INFORMATION RECORDING LAYERS

[75] Inventor: Katsumi Suzuki, Tokyo, Japan

[73] Assignee: Kabushiki Kaisha Toshiba, Kawasaki, Japan

[21] Appl. No.: 821,682

[22] Filed: Mar. 20, 1997

[30] Foreign Application Priority Data

Mar. 21, 1996 [JP] Japan .................................... 8-064217

[51] Int. Cl.$^6$ ...................................................... G11B 7/24
[52] U.S. Cl. ........................................ 369/275.1; 428/64.4
[58] Field of Search ................................. 369/275.1, 94, 369/109, 275.2, 275.5, 280.1, 283; 428/64.1, 64.2, 64.3, 64.4

[56] References Cited

U.S. PATENT DOCUMENTS

| | | | |
|---|---|---|---|
| 5,625,609 | 4/1997 | Latta et al. | 369/275.1 |
| 5,627,817 | 5/1997 | Rosen et al. | 369/275.1 |
| 5,645,908 | 7/1997 | Shin | 369/275.1 |
| 5,689,497 | 11/1997 | Wilting et al. | 369/275.1 |

*Primary Examiner*—Tan Dinh
*Attorney, Agent, or Firm*—Pillsbury Madison & Sutro LLP

[57] ABSTRACT

In a double-layered optical disk capable of reading two-layer information from one face, the substrates constituting this optical disk can hardly peel even with a dropping shock or a change over time. The double-layered optical disk is constituted by a transparent first substrate, a first information recording layer, and a second substrate adhered to the first substrate through the first information recording layer. The first substrate has information pits to be read with a read laser beam and is transparent to this read laser beam. The first information recording layer is formed on the information pit formation surface of the first substrate and is made of an inorganic dielectric having a higher refractive index than that of the first substrate.

26 Claims, 14 Drawing Sheets

DOUBLE-LAYERED INFORMATION RECORDING MEDIUM HAVING INFORMATION RECORDING LAYERS

BACKGROUND OF THE INVENTION

The present invention relates to an improvement in the structure of an information recording medium on which address information, header information, moving picture information, audio information, and any other information are recorded.

More particularly, the present invention relates to an improvement in a high-density optical disk obtained by adhering two transparent substrates on which various kinds of information are recorded as embossed prepits, wherein at least some of information recording layers having prepits are made of a material having a higher refractive index than that of each substrate of the double-layered optical disk.

In multimedia applications for processing image information in a large quantity, to meet complicated needs and a great increase in quantity of necessary information, strong demand has arisen for a means for holding information in a larger size and allowing quick information access. A typical example of such an information holding means is an optical disk.

The most popular media belonging to the optical disks are a compact disk (CD) developed as a recording medium for music, a CD-ROM developed as a recording medium for computer data, and a laser disk (LD) developed as a recording medium for movies (moving pictures). These optical disks may have difficulty coping with future multimedia applications.

New types of media which can cope with the needs for large capacities and the high-speed, flexible information access are next-generation main recording media which are about to be on the market, i.e., a digital versatile disk and a digital video disk (to be referred to as a DVD hereinafter).

The capacity of one DVD disk standard, i.e., the capacity of a double-layered DVD having 0.6-mm thick transparent substrates (polycarbonate) is about 10 Gbytes on the two faces. Each face has a capacity of about 5 Gbytes. A 135-minute movie can be compressed on one face in accordance with the MPEG (Moving Picture Expert Group) standards.

A DVD disk employs a double-layered structure. For this reason, to read all the information on the two faces of the disk, the disk must be turned over at the end of a read operation on one face or a laser pickup (read optical head) must be moved from the upper face to the lower face of the disk, judging from the operation of a conventional optical disk (e.g., an LD). A user must turn over the disk at the end of a read operation on one face, resulting in inconvenience. Alternatively, an optical head for reading information from the two faces must be arranged to complicate the arrangement of a read apparatus. That is, a compact read apparatus is difficult to obtain, and the product cost becomes high, thus posing a problem.

To solve the above problem (i.e., the disk must be turned over, or the complicated two-face read mechanism is required), the following structure is employed in a DVD disk. More specifically, a semi-transparent film is used as a recording layer (first recording layer) on the read laser receiving face (upper face) facing an optical head and information on a recording layer (second recording layer) on the face (lower face) opposing the optical head can also be read. With this structure, the optical disk is always located on one face (upper face) side of the disk. The read face is switched by changing the focal point of the optical head between the first and second recording layers.

In this case, the transmittance of the first recording layer (transparency to the read laser beam) on the upper face side must be high to properly read information from the second recording layer as the lower face. The reflectance of the first recording layer (reflectance with respect to the same read laser beam as the transmitted laser beam) must be high.

Normally, a high transmittance contradicts a high reflectance with respect to the same laser beam. The number of transmission/reflection materials which balance the above contradictory factors on a practical level is limited. An example of such a material is a very thin gold film. When the first recording layer on the upper face side of the optical disk is made of a very thin gold film, it is difficult to assure the mechanical strength at this gold film portion because two disk substrates are adhered to each other through the very thin gold film. That is, when a user drops a double-layered disk in which the very thin gold film is present on the adhesion face, the two substrates of the double-layered disk may peel at this gold film portion due to a shock. Even in the absence of a dropping shock, the two substrates of the double-layered disk may peel at the thin gold film portion after long-term storage or in a high-temperature, high-humidity accelerated degradation test. In addition, since gold is an expensive material, it is disadvantageous to employ a thin gold film due to the disk manufacturing cost.

BRIEF SUMMARY OF THE INVENTION

It is the first object of the present invention to provide a double-layered information recording medium capable of reading information on one or two of recording layers on two disk substrates from one face side of the double-layered disk, wherein the two disk substrates are prevented from peeling caused by a dropping shock or a change over time.

It is the second object of the present invention to provide a method of manufacturing the above double-layered information recording medium.

In order to achieve the first object described above, an information medium according to the present invention comprises: a first substrate (30) having an information pit read with a predetermined light beam (RL) and transparent to the predetermined light beam (RL); a first information recording layer (10) formed on an information pit formation face of the first substrate (30) and made of an inorganic dielectric (Si, $TiO_2$, $Si_2N_3$ or $Si_3N_4$) having a higher refractive index (n=4 for Si; n=2.2 for $TiO_2$; n=2.0 for $Si_3N_4$) than that of the first substrate (30); and a second substrate (40) adhered to the first substrate (30) through the first information recording layer (10).

In the recording medium having the above structure, even if the inorganic dielectric (Si, $TiO_2$, or $Si_3N_4$) layer is not excessively made thin, a high transmittance and a high reflectance can be obtained with respect to the read beam (e.g., in FIG. 6, see a transparency T and a reflectance R of a silicon thin film having a thickness of 20 or 80 nm). Since the thickness of this inorganic dielectric layer can be assured to some extent, peeling of the two disk substrates by a dropping shock or a change over time can hardly occur.

Another information recording medium according to the present invention comprises: a first substrate (30) having an information pit read with a predetermined light beam (RL) and transparent to the predetermined light beam (RL); a first information recording layer (10) formed on an information pit formation face of the first substrate (30) and made of an inorganic dielectric (Si, TiO$_2$, Si$_2$N$_3$ or Si$_3$N$_4$) having a higher refractive index (n=4 for Si; n=2.2 for TiO$_2$; n=2.0 for Si$_3$N$_4$) than that of the first substrate (30); a second substrate (40) having another information pit read with the light beam (RL); a second information recording layer (20) formed on an information pit formation face of the second substrate (40) and made of a reflection material (Al, Al—Mo) which reflects the light beam (RL); and an adhesive layer (50) for adhering the first substrate (30) and the second substrate (40) so that the first information recording layer (10) faces the second information recording layer (20).

In the recording medium having this structure, since the thickness of this inorganic dielectric layer can be assured to some extent, peeling of the two disk substrates by a dropping shock or a change over time can hardly occur. Since the inorganic dielectric layer constituting the first information recording layer (10) can have a high transmittance and a high reflectance with respect to the read light beam, information on the second information recording layer (20) can be read on the practical level even if the inorganic dielectric layer is present in the optical path of the read light beam.

Still another information recording medium according to the present invention comprises: a transparent disk-like first substrate (30) on which information is recorded as an embossed pit; an inorganic dielectric film (10) formed on an embossed pit side of the first substrate (30) and having a higher refractive index (n=4 for Si; n=2.2 for TiO$_2$; n=2.0 for Si$_3$N$_4$) than that (about 1.6 for polycarbonate) of the first substrate (30); a second substrate (40) having the same shape as the first substrate (30); and an adhesive portion (50) for adhering the first substrate (30) and the second substrate (40) so that the inorganic dielectric film (10) faces the second substrate (40).

Still another information recording medium according to the present invention comprises: a transparent disk-like first substrate (30) on which information is recorded as an embossed pit; an inorganic dielectric film (10) formed on an embossed pit side of the first substrate (30) and having a higher refractive index (n=4 for Si; n=2.2 for TiO$_2$; n=2.0 for Si$_3$N$_4$) than that (about 1.6 for polycarbonate) of the first substrate (30); a disk-like second substrate (40) on which another information is recorded as an embossed pit; a reflection film (20) formed on an embossed pit side of the second substrate (40); and an adhesive portion (50) constituted by a transparent organic material to adhere the first substrate (30) and the second substrate (40) so that the inorganic dielectric film (10) faces the reflection film (20).

Still another information recording medium according to the present invention comprises: a transparent disk-like first substrate (30) on which information is recorded as an embossed pit; an inorganic dielectric (ZnS.SiO$_2$) film (10) formed on an embossed pit side of the first substrate (30) and having a higher refractive index than that (1.55±0.10; about 1.6 for polycarbonate) of the first substrate (30); a disk-like second substrate (40) on which another information is recorded as an embossed pit; a write/read, write/read/erase, or overwrite enable recording film (90) formed on an embossed pit side of the second substrate (40); and an adhesive portion (50) made of a transparent organic material to adhere the first substrate (30) and the second substrate (40) so that the inorganic dielectric film (10) faces the recording film (90).

The recording medium having this structure has the read/write enable recording film (90) and therefore can constitute a large-capacity optical disk RAM.

A method of manufacturing an information recording medium according to the present invention comprises: the first step (ST10 to ST22 in FIG. 13) of forming an inorganic dielectric film (10; for example, Si) having a first predetermined thickness (e.g., 20 nm) on a pit formation face of a transparent disk-like first substrate (30) on which information is recorded as an embossed pit, the inorganic dielectric film having a higher refractive index (about 4 for Si) than that (1.55±0.10; about 1.6 for polycarbonate) of the first substrate (30); the second step (ST30 to ST42 in FIG. 14) of forming a reflection film (20) having a second predetermined thickness (up to 100 nm) on a pit formation face of a disk-like second substrate (40) on which information is recorded as an embossed pit; and the third step (steps in FIGS. 9 to 12 or steps in FIGS. 20A to 20D) of facing a face on which the inorganic dielectric film (10) of the first substrate (30) is formed in the first step and a face on which the reflection film (20) of the second substrate (40) is formed in the second step, and adhering the first substrate (30) and the second substrate (40) through a transparent adhesive layer (50).

Still another information recording medium according to the present invention comprises: a first substrate (30) having an information pit read with a predetermined light beam (RL) and transparent to the light beam; a first information recording layer (10) formed on an information pit formation face of the first substrate and made of a material (e.g., silicon or silicon nitride) having a higher refractive index than that of the first substrate; a second substrate (40) adhered to the first substrate so as to interpose the first information recording layer through a predetermined adhesive layer (50); and a second information recording layer (20) formed on an information pit formation face of the second substrate, wherein physical properties (e.g., refractive indices and thicknesses) of the first substrate, the first information recording layer (10), the adhesive layer (50), and the second information recording layer (20) are determined so that reflectances of the first information recording layer (10) and the second information recording layer (20) are set to about 18% or more each with respect to the light beam (RL) incident from the first substrate (30) to the second substrate (40).

The reflectance for the light beam (RL) is set to fall within the range of about 18% to about 30%.

The first information recording layer (10) can be made of silicon nitride (e.g., Si$_3$N$_4$).

The adhesive layer (50) is made of an ultraviolet curing resin having a thickness of 40 μm to 70 μm.

In order to achieve the second object, a method of manufacturing an information recording medium according to the present invention comprises: the first step (ST10 to ST22 in FIG. 13) of forming an inorganic dielectric film (10; e.g., ZnS.SiO$_2$) having a first predetermined thickness (e.g., 20 nm) on a pit face of a transparent disk-like first substrate (30) on which information is recorded as an embossed pit, the inorganic dielectric film having a higher refractive index (about 4 for Si) than that (1.55±0.10; about 1.6 for polycarbonate) of the first substrate (30); the second step (ST50 to ST64 in FIG. 15) of forming a phase change recording film (90) having a second predetermined thickness (e.g., 20 nm) on a pit face of a disk-like second substrate (40) on which information is recorded as an embossed pit, the phase change recording film (90) being subjected to a reversible phase change between an amorphous phase and a crystalline phase; and the third step (steps in FIGS. 9 to 12 or steps in FIGS. 20A to 20D) of facing a face on which the inorganic dielectric film (10) of the first substrate (30) is formed in the first step and a face on which the phase change recording film (90) of the second substrate (40) is formed in the second step, and adhering the first substrate (30) and the second substrate (40) through a transparent adhesive layer (50).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
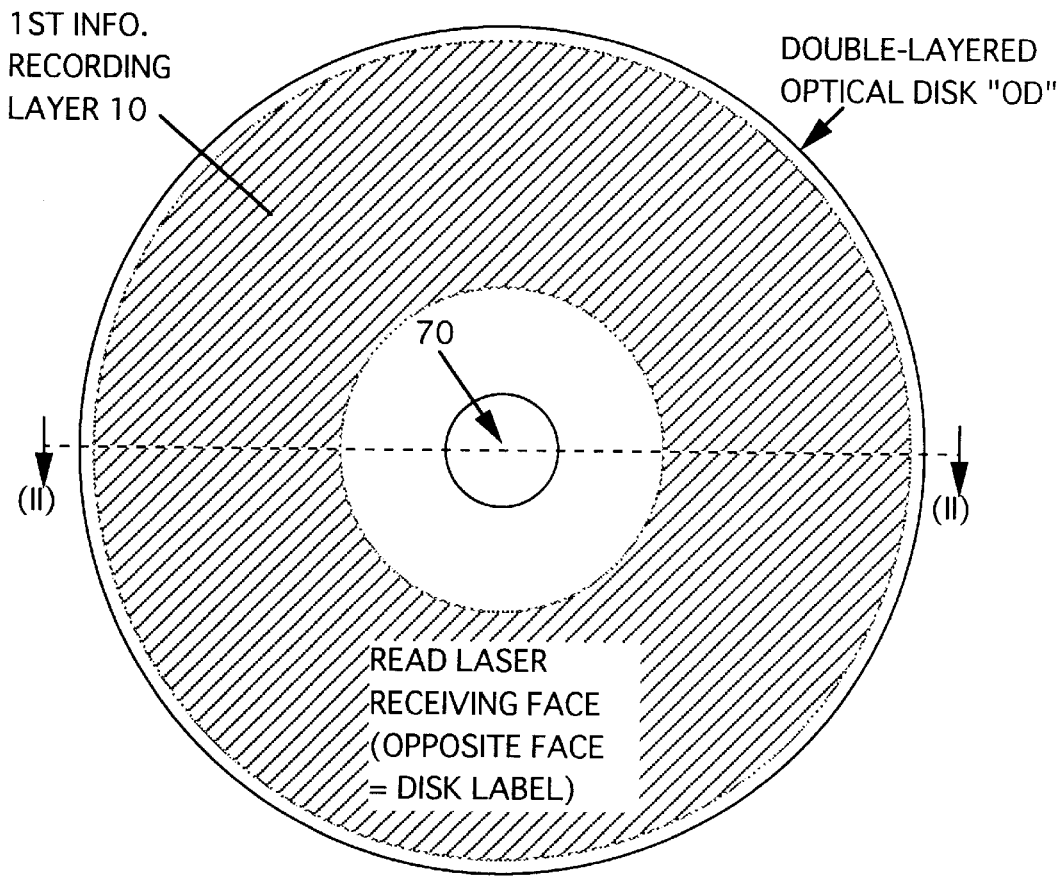
FIG. 1 is a plan view of a double-layered optical disk according to an embodiment of the present invention when viewed from a read laser receiving face.

A double-layered information recording medium according to an embodiment of the present invention will be described with reference to the accompanying drawing. To avoid a repetitive description, the same reference numerals denote the same parts having the same functions throughout the plurality of views.

FIG. 1 is a plan view of double-layered optical disk OD used as an example of a doubled-layered information recording medium of the present invention when viewed from a read laser receiving face side. This optical disk OD has a thickness of 1.2 mm obtained such that two substrates each having an outer diameter of 120 mm, central hole 70 having a diameter of 15 mm, and a thickness of 0.6 mm are adhered to each other. Each substrate has a doughnut-like information recording layer (only first information recording layer 10 on one substrate is illustrated in FIG. 1). Each of the doughnut-like information recording layers has an inner diameter of about 45 mm and a maximum outer diameter of about 117 mm.

Figure 2:
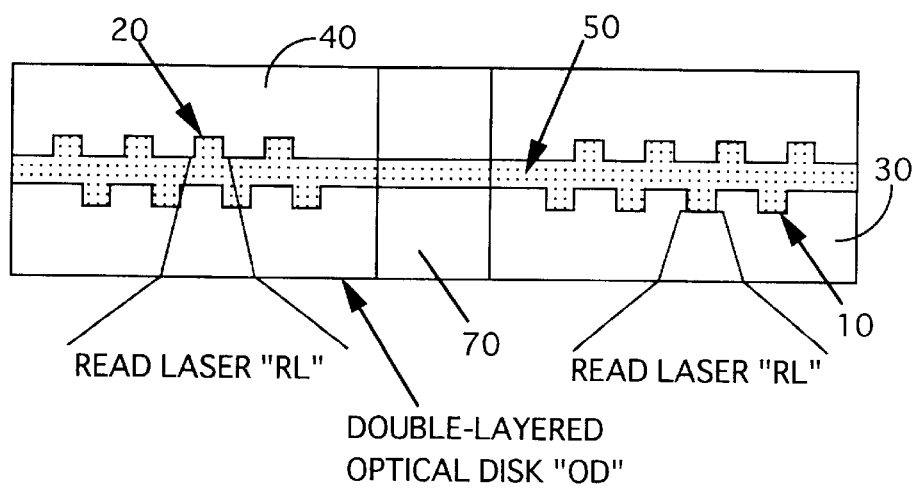
FIG. 2 is a view illustrating part of the section along the line (II)—(II) of FIG. 1.

FIG. 2 illustrates part of the enlarged section along the line (II)—(II) of double-layered optical disk OD in FIG. 1. As shown in FIG. 2, when viewed from the side on which read laser beam RL (e.g., a semiconductor laser beam having a wavelength of 650 nm) is incident, this disk OD comprises polycarbonate substrate 30 (thickness of about 0.6 mm) for holding the first information recording layer, first information recording layer 10 (a semi-transparent film having a higher refractive index than that of substrate 30; thickness of about 20 nm to 1,000 nm) on which information is recorded as embossed pits, an adhesive layer 50 (e.g., an ultraviolet curing resin) transparent to laser beam RL, second information recording layer (reflection film; thickness of 40 nm or more, e.g., about 100 nm) 20 on which second information (information on the lower face of disk OD) is recorded as embossed pits, and polycarbonate substrate 40 for the second information recording layer.

Note that label LB on which information (visual pattern information such as characters, a picture, and a pattern) associated with recorded information (first information and second information) is adhered, as needed, on the face of substrate 40 which opposes substrate 30 on which read laser beam RL is incident.

Figure 3:
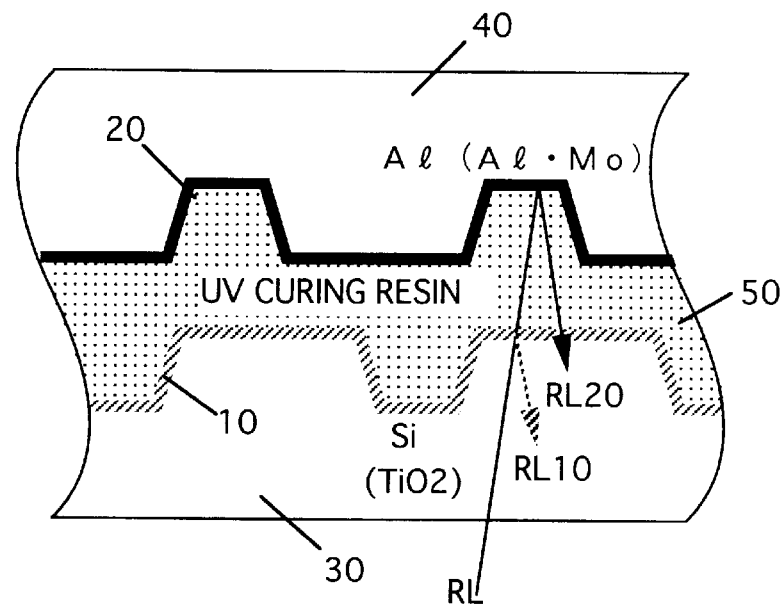
FIG. 3 is a partial sectional view illustrating the data recording portion (embossed pits) of the double-layered optical disk (read only)

FIG. 3 is a partial sectional view of the data recording portion (embossed pits) of the double-layered optical disk (read only) in FIG. 1. Inorganic dielectric 10 constituting the first information recording layer consists of silicon (Si) having refractive index n of about 4. Inorganic dielectric 10 may be made of another semi-transparent film having a higher refractive index than that (n=1.6) of polycarbonate substrate 30. For example, a titanium oxide (TiO$_2$) having refractive index n of 2.2 can be used to constitute the inorganic dielectric of first information recording layer 10.

First information recording layer 10 may be made of silicon nitride (Si$_3$N$_4$) having refractive index n of about 2.0.

The refractive index of layer 10 is made higher than that of substrate 30 to reflect laser beam RL focused and incident on layer 10 at the interface (i.e., a face on which the refractive index abruptly changes) between layer 10 and substrate 30 (if the refractive index of layer 10 is equal to that of substrate 30, layer 10 and substrate 30 are regarded as an optically homogenous material with respect to laser beam RL, and no reflection of the laser beam occurs at this interface. In this case, almost no reflected laser beam RL10 is obtained from layer 10, and the first information recorded on layer 10 cannot be read).

The thickness of inorganic dielectric layer 10 can be selected from the range of 20 nm to 1,000 nm, and more preferably from the range of 20 nm to 280 nm (the ground for determining the thickness of inorganic dielectric layer 10 will be described later with reference to FIG. 6).

Thin film 20 for the second information recording layer is made of a reflection material such as aluminum (Al) or an aluminum-molybdenum alloy (Al—Mo).

The thickness of aluminum-molybdenum alloy thin film 20 for forming the second information recording layer is selected to be 40 nm or more to obtain a practically sufficient laser beam reflectance of layer 20 (reflectance of 80% or more). In this embodiment, the thickness of second information recording layer 20 is selected to be about 100 nm.

Second information recording layer 20 can be formed using only aluminum. However, when a refractory metal such as molybdenum, tantalum, cobalt, chromium, titanium, or platinum is alloyed with aluminum, degradation (environmental reliability) over time in the reflectance of thin film 20 for the second information recording layer can be greatly improved.

Molybdenum has a function of improving antioxidation of second information recording layer 20. The content of molybdenum has an optimal range and falls within the practical range of 1 at % to 20 at %. The molybdenum content in aluminum-molybdenum alloy thin film 20 preferably falls within the range of 1 at % to 20 at %. In this embodiment, the molybdenum content is set to 20 at %. When the molybdenum content exceeds 20 at %, laser beam reflectance of second information recording layer 20 decreases even if the thickness of thin film 20 is assured to be 40 nm or more.

The following operation is performed to read information from the two faces of disk OD without moving an optical pickup (corresponding to optical head 600 in FIG. 5 to be described later) from one face to the other face.

That is, to read information (information on the upper face) of first information recording layer 10 in FIG. 3, the optical pickup is focused to the embossed pits of first information recording layer 10. In this state, the optical pickup detects reflected laser beam RL10 from layer 10 to read the information from the upper face of the disk. To read information (information on the lower face) from second information recording layer 20, the optical pickup is focused on the embossed pits of second information recording layer 20. In this state, the optical pickup detects reflected laser beam RL20 from layer 20, thereby reading information from the lower face of the optical disk.

To read information on the two faces from one face side of the disk as described above, the thickness of adhesive layer 50 (an organic material such as an ultraviolet curing resin) is determined to fall within the actuation range (working distance) of the objective lens (not shown) of the optical pickup (not shown) or within the range in which reflected light from a portion other than the laser beam-focused face does not become disturbance for reflected light (RL10 or RL20 in FIG. 3) from the focused face.

More specifically, the thickness of transparent adhesive layer 50 is determined such that when the optical pickup detects reflected laser beam RL10 from layer 10, reflected laser beam RL20 is weakened, and when the optical pickup detects reflected bream RL20 from layer 20, reflected laser beam RL10 is weakened.

When the optical pickup uses a laser beam having a wavelength of about 650 nm, and an ultraviolet curing resin is used to form adhesive layer 50, the thickness of adhesive layer 50 preferably falls within the range of 40 µm to 70 µm (55 µm ±15 µm).

When the reflectance (%) of first information recording layer (semi-transparent film) 10 is excessively high, the amount of laser beam transmitted through layer 10 is reduced, and the intensity of reflected beam RL20 from second information recording layer (total reflection film) 20 is excessively lowered. To the contrary, when the reflectance (%) of first information recording layer (semi-transparent film) 10 is excessively low, the intensity of reflected laser beam RL10 from layer 10 is excessively lowered even through the intensity of reflected laser beam RL20 is sufficiently high.

The reflectance (%) of first information recording layer (semi-transparent film) 10 must be maximized as far as a sufficient intensity is assured for reflected laser beam RL20 from second information recording layer (total reflection film) 20. From the practical point of view, the reflectance of layer (semi-transparent film) 10 is set to about 18% to 30% at present (provided that the reflectance of layer 10 can be assured to be 18% or more while sufficiently assuring the intensity of reflected laser beam RL20 in accordance with a method to be described with reference to FIG. 6).

Examples of the material of transparent adhesive layer 50 are an ultraviolet (UV) curing resin, a hot-melt type resin, and a double-coated tape without a base. To assure the thickness of adhesive layer 50 to, e.g., 50 µm over the entire face of disk OD, a UV resin or double-coated tape is preferable. In particular, when a spacer having a prescribed thickness of 50 µm is used to manage the thickness of adhesive layer 50 as in a double-layered disk manufacturing method described with reference to FIGS. 20A to 20D, it is most preferable that a UV resin be spin-coated to form a double-layered disk (the thickness of this transparent adhesive layer 50 is selected from the range of 55±15 µm).

An example of the ultraviolet (UV) curing resin used to adhere the polycarbonate substrates is an acrylate resin. When an influence on a reflection film and reliability after adhesion are taken into consideration, an epoxy- or urethane-based acrylate resin is particularly preferable as the UV resin.

Refractive index n of the UV resin used to adhere the polycarbonate substrates is selected to be close to the refractive index (about 1.6) of the polycarbonate substrate. More specifically, refractive index n of this UV resin is preferably managed within the range of 1.5 to 1.7.

When gold (Au) or copper (Cu) is selected as the material of first information recording layer (semi-transparent film) 10, the reflectance of layer 10 appropriately falls within the range of about 18% to 30%. In this case, the thickness of layer 10 must be as very small as about 5 nm to 20 nm. When an extremely thin metal film is used, a sufficient adhesion strength at the interface between layer 10 and adhesive layer 50 cannot be assured, and substrates 30 and 40 may peel due to a dropping shock or the like. Even if substrates 30 and 40 are temporarily properly adhered to each other, substrates 30 and 40 may peel during long-term storage or in an accelerated degradation test.

To prevent such a "peeling" accident, an inorganic dielectric material such as silicon is used to form first information recording layer (semi-transparent film) 10 so as to assure a certain thickness and obtain a sufficiently high adhesion strength at the interface with adhesive layer 50.

An inorganic dielectric such as silicon has a high transparency to laser beam RL (wavelength: 650 nm) even if the dielectric has a certain thickness (e.g., 20 nm, 80 nm, or 160 nm). Refractive index n of inorganic dielectric layer 10 made of silicon or the like is a higher than that of polycarbonate substrate 30 (i.e., n=4 for silicon with respect to n=1.6 for polycarbonate). Therefore, when a laser beam is focused on layer 10, laser beam RL is relatively largely reflected between substrate 30 and layer 10.

Inorganic dielectric layer 10 is formed to a certain thickness to assure the adhesion strength of optical disk OD, and at the same time, a high transparency and a high reflectance of layer 10 can be simultaneously satisfied.

Figure 4:
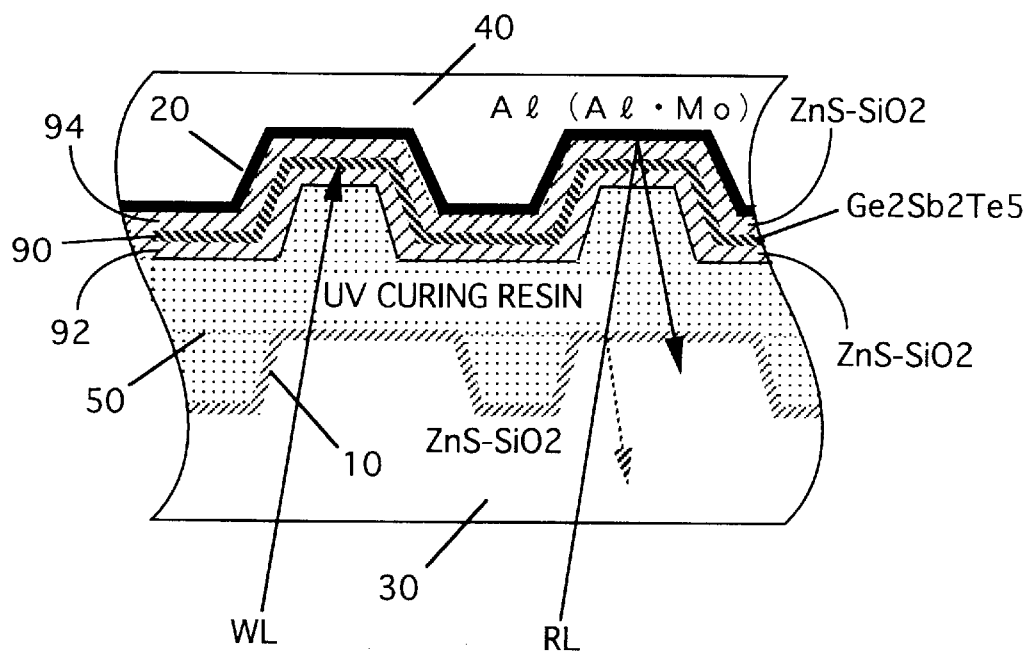
FIG. 4 is a partial sectional view illustrating the data recording portion (embossed pits) of the double-layered optical disk (both read and write)

FIG. 4 is a partial sectional view illustrating the data recording portion when double-layered optical disk OD in FIG. 1 is used for both read and write operations. In place of silicon in FIG. 3, a mixture (ZnS.SiO$_2$) of zinc sulfide (ZnS) and silicon oxide (SiO$_2$) is used to form inorganic dielectric layer 10 having a thickness of, e.g., 20 nm.

Three layers (90 to 94) obtained by sandwiching phase change recording material (Ge$_2$Sb$_2$Te$_5$) layer 90 between two zinc sulfide-silicon oxide mixture (ZnS.SiO$_2$) layers (92 and 94) are formed between ultraviolet curing resin adhesive layer 50 and reflection film 20 using aluminum (Al) or an aluminum-molybdenum alloy (Al—Mo). The thickness of aluminum reflection film 20 is selected to, e.g., about 100 nm, the thickness of ZnS.SiO$_2$ mixture layer 94 is selected to, e.g., about 20 nm, the thickness of Ge$_2$Sb$_2$Te$_5$ phase change recording material layer 90 is selected to, e.g., about 20 nm, and the thickness of ZnS.SiO$_2$ mixture layer 92 is selected to, e.g., about 180 nm.

No embossed pit signals are recorded on read-only substrate 40, while read-only information is recorded on substrate 30 as embossed pits. In place of the embossed pit signals, a continuous groove is formed in substrate 40. Phase change recording material layer 90 is formed in this groove.

Figure 5:
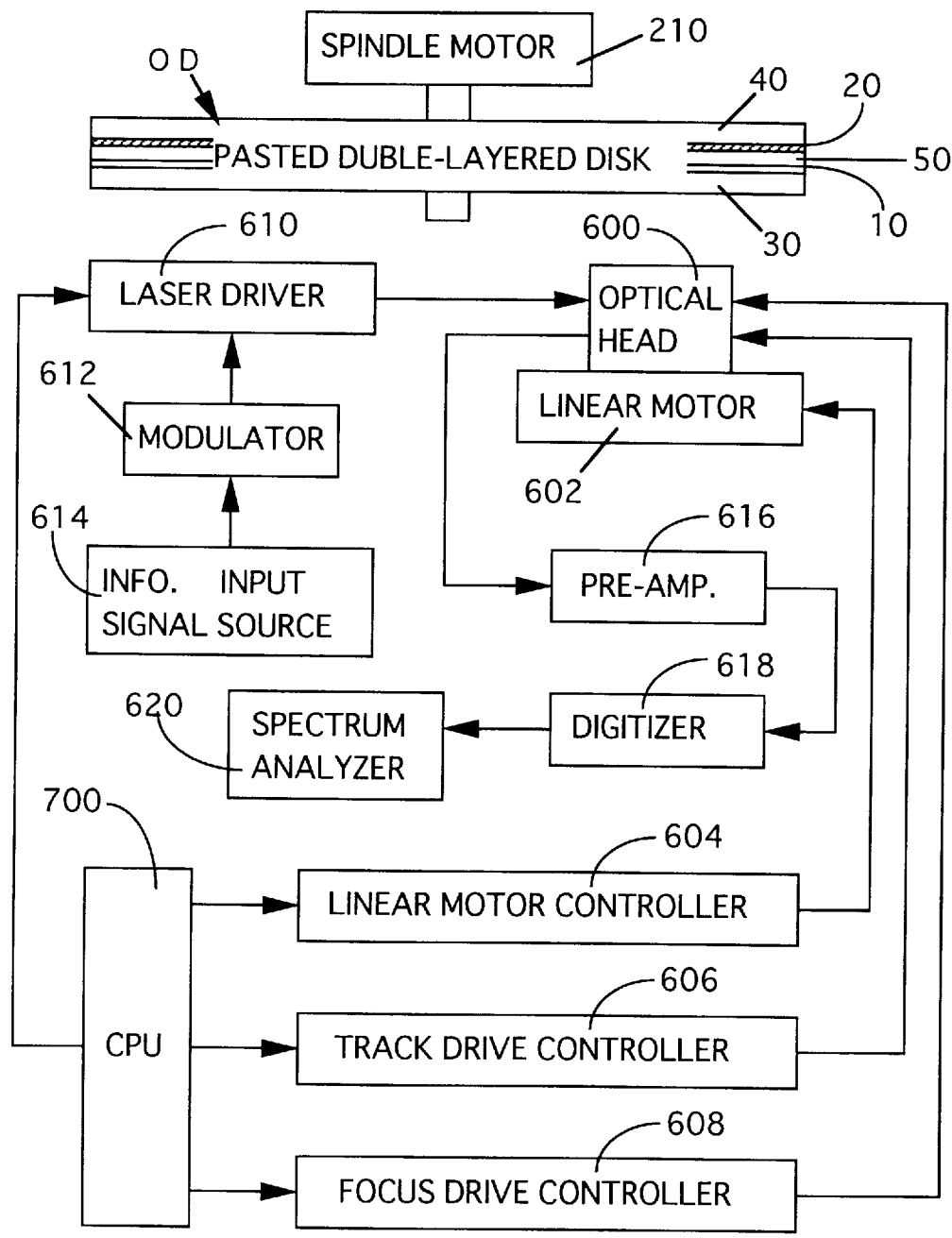
FIG. 5 is a block diagram for explaining the arrangement of an optical disk drive apparatus for evaluating the performance of the double-layered optical disk in FIG. 1.

FIG. 5 is a block diagram showing the arrangement of an optical disk drive apparatus for evaluating the performance of double-layered optical disk OD shown in FIG. 1.

When each optical disk OD (a plurality of sample disks to be described later) is set in the drive apparatus, rotation of the disk is controlled by spindle motor 210 such that a constant linear speed of 3.6 m/s is obtained at each radial position (linear speed constant control).

Optical head 600 is driven by laser driver 610 controlled by CPU 700 to irradiate a continuous laser beam (read laser beam) having a power of 1 mW onto disk OD. Head 600 is positioned along the radial direction of disk OD by linear motor 602 controlled by linear motor controller 604 connected to CPU 700. Head 600 is positioned at a track position of disk OD by track drive controller 606 connected to CPU 700. An operation for focusing a laser beam on upper- or lower-face information recording layer 10 or 20 is performed by focus drive controller 608 connected to CPU 700.

When sample disk OD is a read/write disk (see FIG. 4), a signal to be recorded on phase change information recording layer 90 is output from information input signal source 614. This recording signal output is supplied to laser driver 610 through modulator 612. Laser driver 610 performs intensity modulation in two steps, i.e., at a power of 10 mW for data recording and a power of 4 mW for data erasure, thereby driving a laser diode in optical head 600. Optical head 600 irradiates a laser beam (write/read laser beam WL) containing signal information of, e.g., a duty ratio of 50% at 4 MHz onto disk OD, and records this information on phase change information recording layer 90 of disk OD.

A laser beam emitted from optical head 600 is reflected by first information recording layer 10 (or second information recording layer 20) of disk OD which is set in an in-focus state. The reflected laser beam is detected by head 600 again. Reflected laser beam information (read signal) detected by head 600 is amplified by pre-amplifier 616 and digitized by digitizer 618. The digital signal is input to spectrum analyzer 620. Spectrum analyzer 620 measures the read C/N ratio of first information recording layer 10 (or second information recording layer 20), thereby evaluating defectiveness/nondefectiveness of this recording layer.

Figure 6:
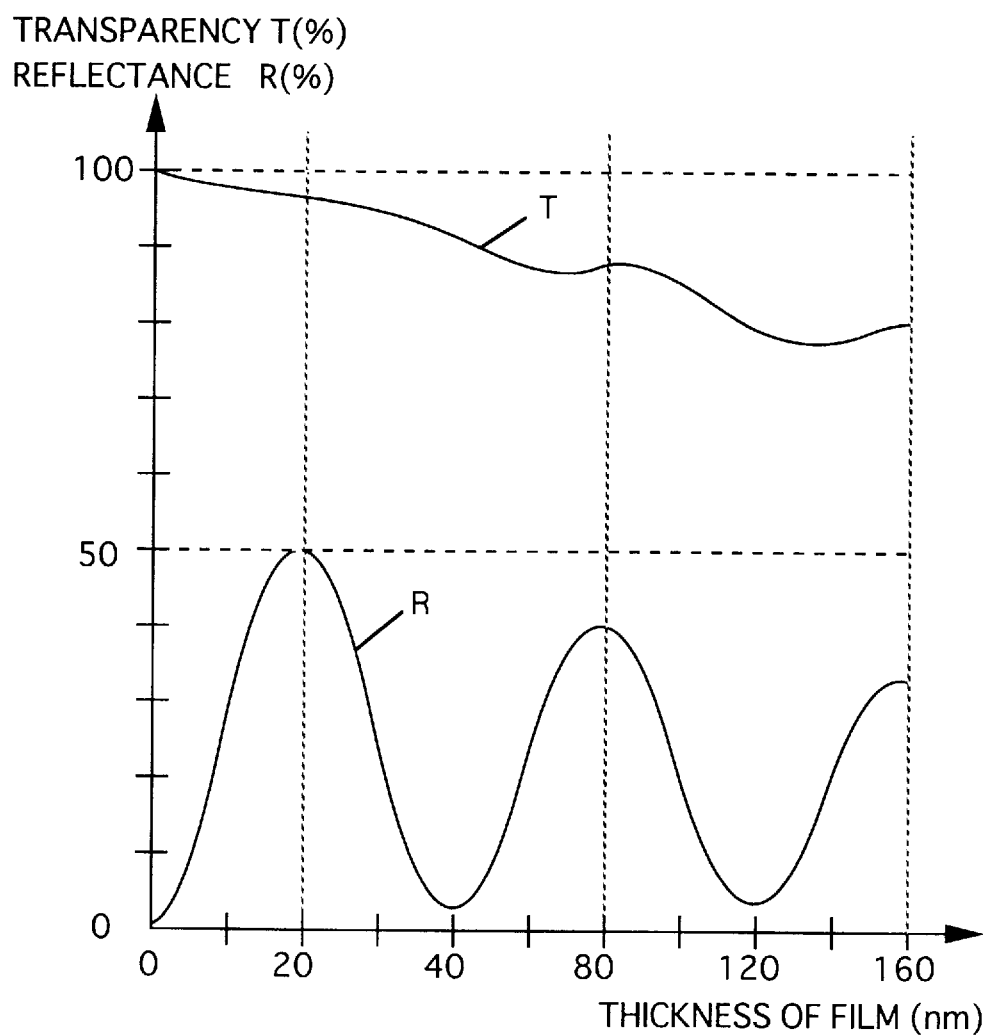
FIG. 6 is a graph for explaining how the reflectance and transparency of a first recording layer (a silicon layer having refractive index n=4) in FIG. 3 change when the thickness of first information recording layer 10 is changed.

FIG. 6 is a graph for qualitatively explaining changes in reflectance R (%) and transparency T (%) of laser beam (coherent light having a wavelength of 650 nm) on first information recording layer (a silicon layer having refractive index n=4) 10 in FIG. 3 when the thickness of first information recording layer 10 changes. This graph is obtained by theoretical calculations (simulation) by excluding variations in film thicknesses of actual products, crystal defects and distortions in inorganic dielectric films, variations in incident angles of laser beams, and the like. It should be noted that the values in this graph have large differences from those of actual products.

In coherent light such as a laser beam, when light components shifted by a ½ wavelength (phase difference $\pi$), i.e., opposite-phase components are synthesized, a subtraction effect (cancellation) occurs to reduce the light intensity. To the contrary, when in-phase components (beams having no opposite-phase components; a phase difference is less than $\pi/2$) are synthesized, an addition effect occurs to increase the light intensity.

A light wavelength having a given frequency is proportional to its propagation speed, and the propagation speed is in inverse proportion to the refractive index. For example, a laser beam having a wavelength of 650 nm in air having a refractive index of 1 has a wavelength of about 160 nm in a substance having a refractive index of 4. The half-wavelength component is 80 nm. When two laser beams (opposite phase) are synthesized with a shift of 80 nm in a propagation path (40 nm in one way of the reciprocal path of layer 10), these laser beams cancel each other. In the structure shown in FIG. 3, this cancellation occurs between the reflected beam at the junction between substrate 30 and Si layer 10 and the reflected beam at the junction between Si layer 10 and UV resin adhesive layer 50. This cancellation minimizes (dip) reflectance R when the thickness of layer 10 is 40 nm.

The difference in optical path length between light a reflected at the interface between layer 10 and substrate 30 and light b reciprocating in reflection layer 10 at the interface between layer 10 and adhesive layer 50 is twice the thickness of layer 10. Light a is not added to and synthesized with light b with the zero optical path difference. The zero optical path difference means the absence of layer 10. This leads to the fact that no reflected light is present at layer 10 (reflectance R of layer 10 is 0%). This is the reason why reflectance R becomes zero at the zero film thickness in FIG. 6.

When the thickness of layer 10 falls within the range of 40 nm to zero, the opposite-phase components of the two reflected light beams are reduced, and in-phase components are increased instead. As a result, reflectance R for layer 10 has a peak at an intermediate point (about 20 nm; figured out as $\pi/2$ in phase difference) in the thickness range of 0 to 40 nm of layer 10 at which two layer beams have in-phase components, as shown in FIG. 6.

When two laser beams (wavelength: 650 nm) are synthesized with a shift of 80 nm (corresponding to 40 nm in one way of a reciprocal path of layer 10) corresponding to the half-wavelength component (phase difference $\pi$) in a propagation path from the minimum reflectance point (i.e., the point of 40 nm in thickness of layer 10), these two laser beams are added and synthesized. This is the reason why reflectance R becomes maximum (peak) at 80 nm in film thickness of layer 10 in FIG. 6.

Since a laser beam vibrates at a single wavelength, the peak and dip of reflectance R are repeated at a predetermined period, as shown in FIG. 6. To obtain both high transparency T and high reflectance R at first information recording layer 10, the thickness of layer 10 is selected centered on 20 nm, 80 nm, or 160 nm (40 nm, 160 nm, or 320 nm in the actual optical path length of a laser beam reciprocated in layer 10). To assure the sufficient adhesion strength between first information recording layer 10 and substrate 30 (i.e., to prevent peeling between substrates 30 and 40 at layer 10), the thickness of layer 10 is made larger.

In fine, not only to satisfy both high transparency T and high reflectance R at first information recording layer 10, but also to prevent peeling of the recording layers at layer 10, the thickness of layer 10 is determined within the range in which transparency T is not excessively lowered, by using as the criterion the peak point of reflectance R at first information recording layer 10.

More specifically, the thickness of layer 10 is selected in the range of 20 nm to 1,000 nm. When the recording layers are preferentially prevented from peeling due to a dropping shock, the thickness of layer 10 is preferably close to 1,000 nm (=1 $\mu$m). However, to assure high transparency T at layer 10 (i.e., a sufficient C/N ratio is assured for a read signal from second information recording layer 20), the thickness of layer 10 is made smaller. From the viewpoint of the practical balance between "prevention of peeling" and "high C/N ratio", the thickness of layer 10 is preferably selected from the range of 20 nm to 280 nm. Within this selection range, the size excluding the values near the dip (minimum point) or peak (maximum point) of reflectance R in FIG. 6 is selected in consideration of corresponding transparency T.

Figure 7:
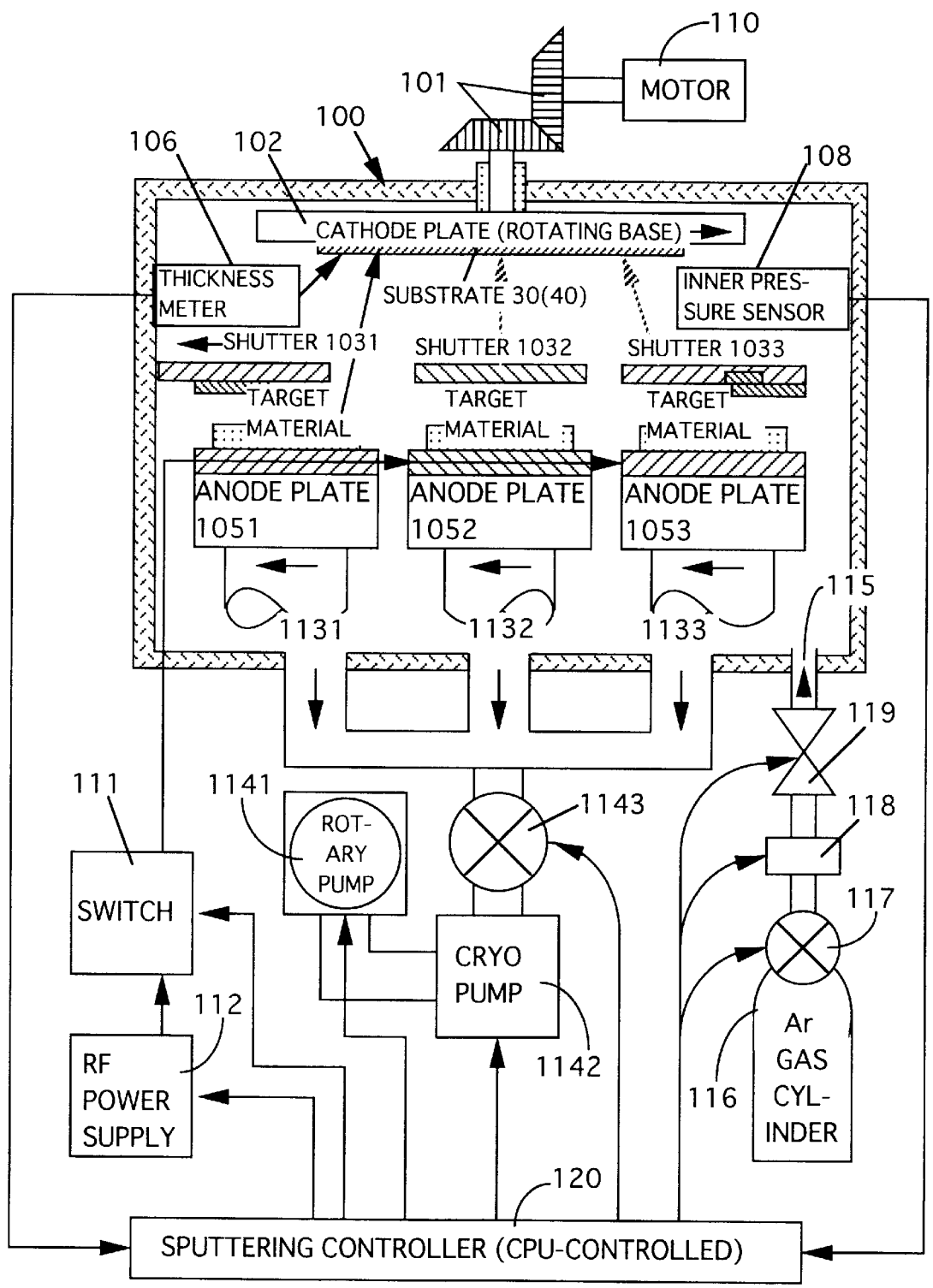
FIG. 7 is a side view for explaining a sputtering apparatus for forming first or second information recording layer 10 or 20 on the double-layered optical disk shown in FIG. 3 or 4.
Figure 8:
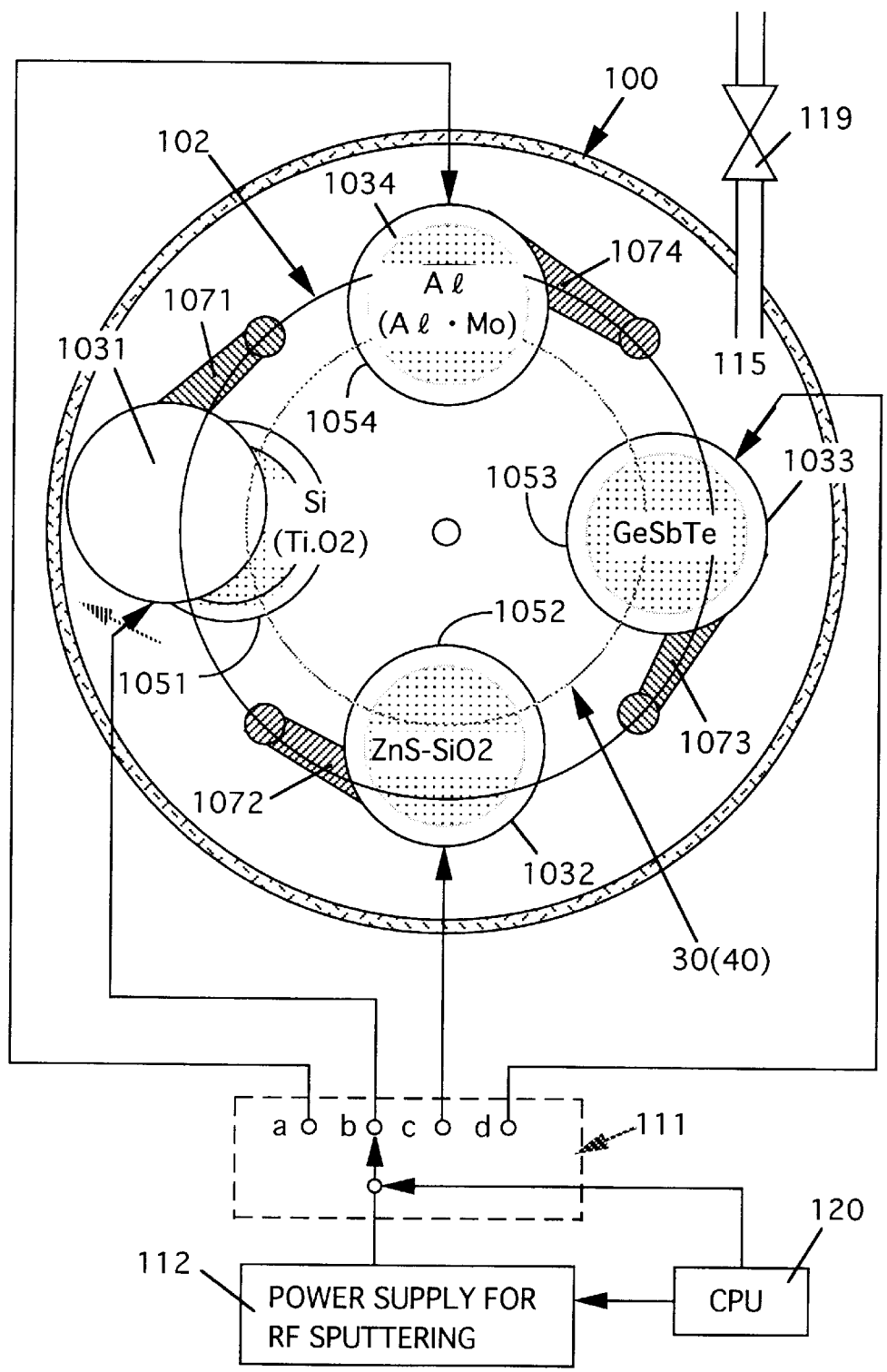
FIG. 8 is a plan view for further explaining the arrangement of the apparatus shown in FIG. 7.

FIG. 7 is a side view showing the schematic structure of a sputtering apparatus for forming first or second information recording layer 10 or 20 on a double-layered optical disk having the structure shown in FIG. 3 or 4. FIG. 8 is a plan view of the apparatus in FIG. 7.

A disk-like rotating base (cathode plate) 102 for supporting polycarbonate substrate 30 (or substrate 40) is disposed near the ceiling in a vacuum vessel, so that the rotating face of cathode plate 102 is horizontal. Substrate 30 (or 40) is supported on the lower face of rotating base 102. A shaft on the upper face side of rotating base 102 is rotated by motor 110 through gear mechanism 101. Although not shown, cathode plate 102 is electrically grounded.

Anode plates 1051 to 1054 on which sputtering sources (four target materials) are placed are disposed to oppose upper rotating base 102. Of all the sputtering sources, a target material (Si or $TiO_2$) constituting inorganic dielectric layer (first information recording layer) 10 of optical disk OD is placed on anode plate 1051. A target material ($Ge_2Sb_2Te_5$) constituting phase change recording layer 90 is placed on anode plate 1053. A target material ($ZnS.SiO_2$) constituting transparent layers 92 and 94 which sandwich inorganic dielectric layer 10 or phase change recording layer 90 is placed on anode plate 1052. A target material (Al or Al—Mo) constituting reflection layer (second information recording layer) 20 is placed on anode plate 1054.

Anode plates 1051 to 1054 are rotated by a motor (not shown) during sputtering. Shutters 1031 to 1034 which can be opened upon pivotal movements of swing arms 1071 to 1074 are disposed between anode plates 1051 to 1054 and cathode plate 102.

To sputter Si or $TiO_2$ on substrate 30, arm 1071 is pivoted to open only shutter 1031. Si or $TiO_2$ on rotating anode plate 1051 is made to oppose rotating cathode plate 102. In this state, an RF voltage is applied to only anode plate 1051 to uniformly form an Si or $TiO_2$ film on substrate 30.

To sputter $ZnS.SiO_2$ on substrate 30 or 40, arm 1072 is pivoted to open only shutter 1032. $ZnS.SiO_2$ on rotating anode plate 1052 is made to oppose rotating cathode plate 102. In this state, an RF voltage is applied to only anode plate 1052 to uniformly form a $ZnS.SiO_2$ film on substrate 30 or 40.

To sputter $Ge_2Sb_2Te_5$ on substrate 40, arm 1073 is pivoted to open only shutter 1033. $Ge_2Sb_2Te_5$ on anode plate 1053 is made to oppose rotating cathode plate 102. In this state, an RF voltage is applied to only anode plate 1053 to uniformly form a $Ge_2Sb_2Te_5$ film on substrate 40.

To sputter aluminum (Al) or aluminum-molybdenum (Al—Mo) on substrate 40, arm 1074 is pivoted to open only shutter 1034. Aluminum (Al) or aluminum-molybdenum (Al—Mo) on rotating anode plate 1054 is made to oppose rotating cathode plate 102. In this state, an RF voltage is applied to only anode plate 1054 to uniformly form an aluminum (Al) or aluminum-molybdenum (Al—Mo) film on substrate 40.

One of anode plates 1051 to 1054 to which the sputtering RF voltage is applied is determined by the switched state of switch 111. More specifically, to sputter Si or $TiO_2$, the RF voltage output from RF power supply 112 is applied to anode plate 1051 through contact b of switch 111. To sputter $ZnS.SiO_2$, the RF voltage output from RF power supply 112 is applied to anode plate 1052 through contact c of switch 111. To sputter $Ge_2Sb_2Te_5$, the RF voltage output from RF power supply 112 is applied to anode plate 1053 through contact d of switch 111. To sputter aluminum (Al) or aluminum-molybdenum (Al—Mo), the RF voltage output from RF power supply 112 is applied to anode plate 1054 through contact a of switch 111.

Contact selection control for switch 11 and RF voltage output control for RF power supply 112 are performed by the internal CPU in sputtering controller 120.

Vacuum vessel 100 is connected to an exhaust apparatus (1141 to 1143) controlled by controller 120 through gas exhaust ports 1131 to 1133. This exhaust apparatus is constituted by rotary pump 1141, cryo pump 1142, and valve 1143. Before sputtering, when valve 1143 is opened, vacuum vessel 100 is exhausted by rotary pump 1141 and further exhausted by cryo pump 1142, so that a high-vacuum state on the $\mu$Torr level can be obtained.

Once the above high-vacuum state is set, argon gas (inert gas) serving as a sputtering gas is supplied from Ar gas cylinder 116 to vacuum vessel 100 through gas inlet port 115, inlet valve 119, control valve (gas flow controller) 118, and valve 117 in a very small amount (mTorr level). The amount of argon gas is checked by internal pressure sensor (vacuum gauge) 108 attached to vacuum vessel 100. The open/closed states of valves 117 to 119 are controlled by controller 120 in accordance with vacuum degree check results of internal pressure sensor 108.

Thickness meter 106 for monitoring the thickness of a thin film (10, 20, 90, 92, or 94) formed by sputtering on substrate 30 or 40 is arranged near cathode plate 102. Controller 120 causes thickness meter 106 to monitor the sputtering amount from the sputtering source to substrate 30 (40). More specifically, controller 120 is programmed to adjust RF powers supplied from RF power supply 112 to anode plates 1051 to 1054 so that each thin film (10, 20, 90, 92, or 94) has a predetermined composition, while monitoring the thin film sputtered on substrate 30 (40).

FIGS. 9 to 12 are side views for explaining the operation sequence of an apparatus for adhering substrates (i.e., first disk substrate 30 having recording layer 10 and second disk substrate 40 having recording layer 20 in FIG. 3) of an optical disk formed by the apparatus in FIG. 7.

Figure 9:
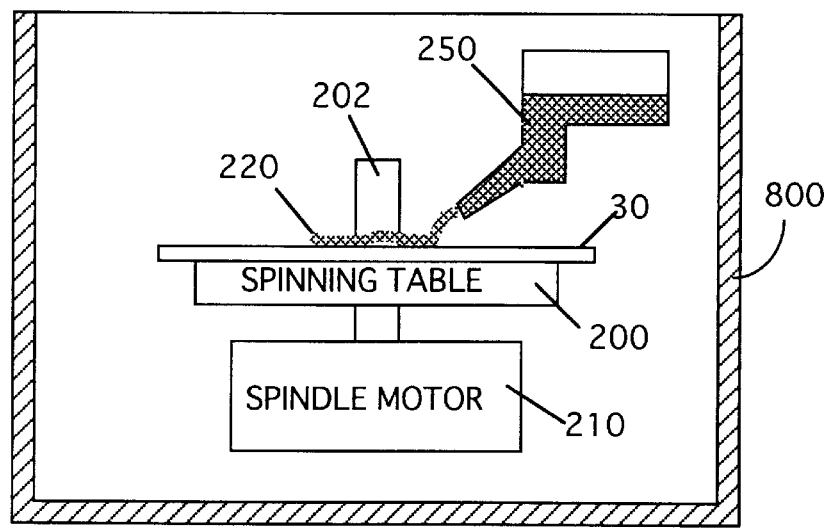
FIG. 9 is a side view for explaining the operation sequence of an apparatus for adhering the substrates (e.g., first disk substrate 30 having recording layer 10 and second disk substrate 40 having recording layer 20 in FIG. 3) of an optical disk formed by the apparatus shown in FIG. 7.
Figure 10:
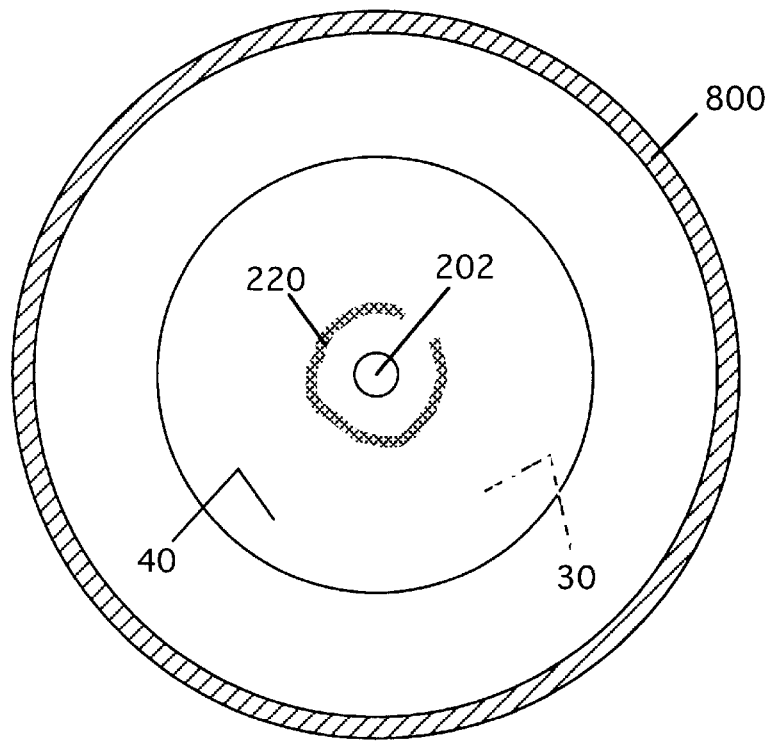
FIG. 10 is a plan view showing a state in which a second disk substrate (40) is placed on a first disk substrate (30) on which an adhesive (220) is poured in the apparatus shown in FIG. 9.
Figure 11:
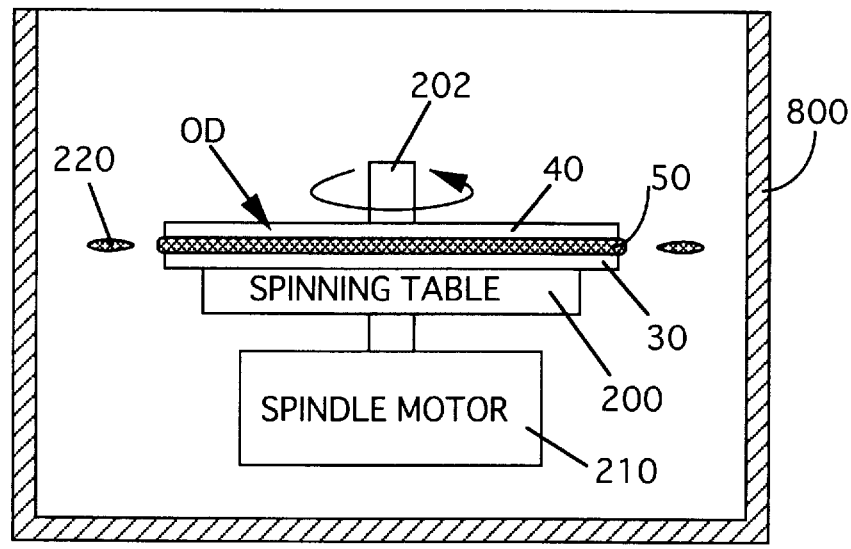
FIG. 11 is a side view for explaining an operation (spin coating) for uniformly forming a thin layer (50) of the adhesive (220) between the substrates by rotating at a high speed the pair of substrates (substrates 30 and 40) which interpose the adhesive (220) in the apparatus shown in FIG. 9.

As shown in FIGS. 9 to 11, this adhering apparatus comprises, in spinner 800, spinning table 200 having guide pin 202 at the center of rotation, spindle motor 210 for rotating spinning table 200, and an adhesive dispenser 250 for appropriately supplying UV resin solution 220 to spinning table 200.

As shown in FIG. 9, polycarbonate substrate 30 having first information recording layer 10 formed thereon is mounted on guide pin 202 and placed on spinning table 200. Transparent UV resin solution 220 is then supplied from dispenser 250 to the central portion of substrate 30 in a predetermined amount.

As shown in FIG. 10, polycarbonate substrate 40 having second information recording layer 20 formed thereon is mounted on guide pin 202 and placed on spinning table 200 so that the layer 20 formation face faces substrate 30.

As shown in FIG. 11, substrates 30 and 40 sandwiching UV resin solution 220 at the central portion are rotated at a predetermined speed for a predetermined period of time. By this rotation, UV resin solution 220 is uniformly spread from the central portion of substrates 30 and 40 to the peripheral portion, so that adhesive layer 50 having a thickness of about 50 $\mu$m is formed between substrates 30 and 40 (this operation is called spin coating of the UV resin solution). Excessive UV resin solution 220 reaching the peripheral portion of substrates 30 and 40 is scattered outside by a centrifugal force by high-speed rotation during spin coating. UV resin solution 220 pressed out at the peripheral portion of substrates 30 and 40 is removed by an appropriate means (not shown).

The double-layered disk of substrates 30 and 40 sandwiching uniform UV resin solution 220 (adhesive layer 50) is placed on belt conveyor 900 with substrate 30 facing upward. The disk is conveyed immediately below UV lamp array 230 in lamp hood 240. UV resin solution 220 between substrates 30 and 40 is cured with ultraviolet irradiation from UV lamp array 230, thereby forming rigid adhesive layer 50 and hence obtaining double-layered optical disk OD.

To manufacture double-layered optical disks OD in mass production, the scale of UV lamp array 230 is increased, and a large number of disks OD are continuously conveyed (temporarily stopped if required) by belt conveyor below UV lamp array 230 at a predetermined speed.

Figure 13:
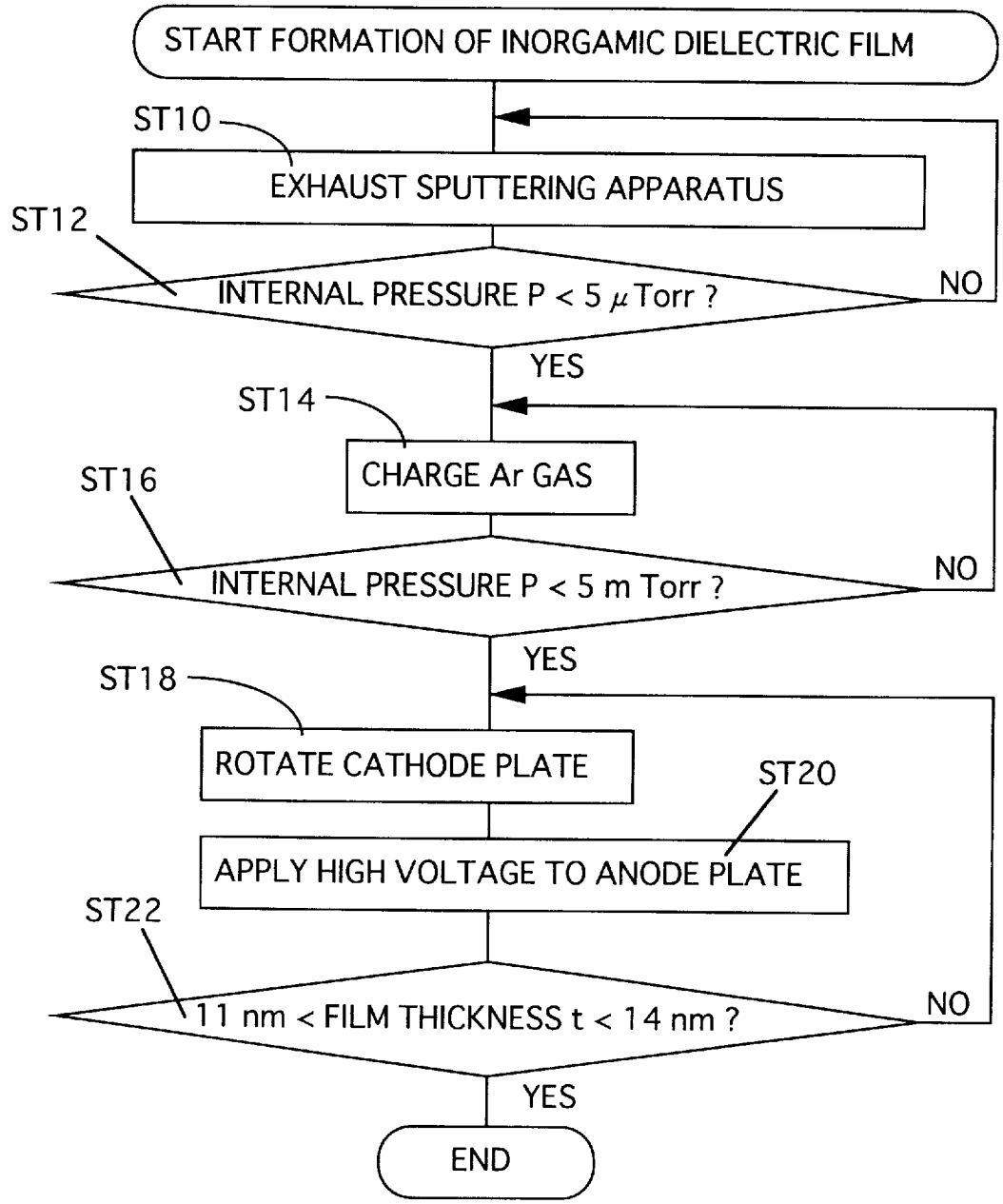
FIG. 13 is a flow chart for explaining the sequence for forming first information recording layer 10 (an inorganic dielectric thin film; Si layer 10 on substrate 30 in FIG. 3; ZnS.SiO$_2$ layer 10 on substrate 30 in FIG. 4) for the double-layered optical disk by using the apparatus shown in FIG. 7.

FIG. 13 is a flow chart for explaining the sequence for forming first information recording layer 10 for double-layered optical disk OD using the apparatus shown in FIGS. 7 and 8. A program corresponding to this sequence is executed by the internal CPU in sputtering controller 120 in FIG. 7.

Controller 120 operates the exhaust apparatus (1141 to 1143) to exhaust vacuum vessel 100 to 5 $\mu$Torr or less while monitoring the internal pressure of vacuum vessel 100 using internal pressure sensor 108 (step ST10 and NO in step ST12). Controller 120 then controls the ON/OFF operation of control valve 118 while monitoring the internal pressure of vacuum vessel 100 using internal pressure sensor 108, thereby supplying argon gas to vacuum vessel 100 at a pressure of 5 mTorr or less (step ST14 and NO in step ST16).

Sputtering an inorganic dielectric (e.g., Si or $TiO_2$) is started using the supplied low-pressure argon gas as a sputtering gas.

More specifically, controller 120 opens shutter 1031 to rotate cathode plate 102 on which substrate 30 is mounted (step ST18). At the same time, while anode plate 1051 on which a target material of Si (or $TiO_2$) is placed is rotated, a predetermined RF power is applied to the sputtering source (e.g., Si) for a predetermined period of time (step ST20) to form first information recording layer 10 having a predetermined thickness (e.g., about 20 nm ±30% or about 80 nm ±30%) (YES in step ST22).

In the above embodiment, up-sputtering is exemplified in which substrate 30 is disposed above the target material. However, side-sputtering may be employed in which substrate 30 is located besides a target material.

Figure 14:
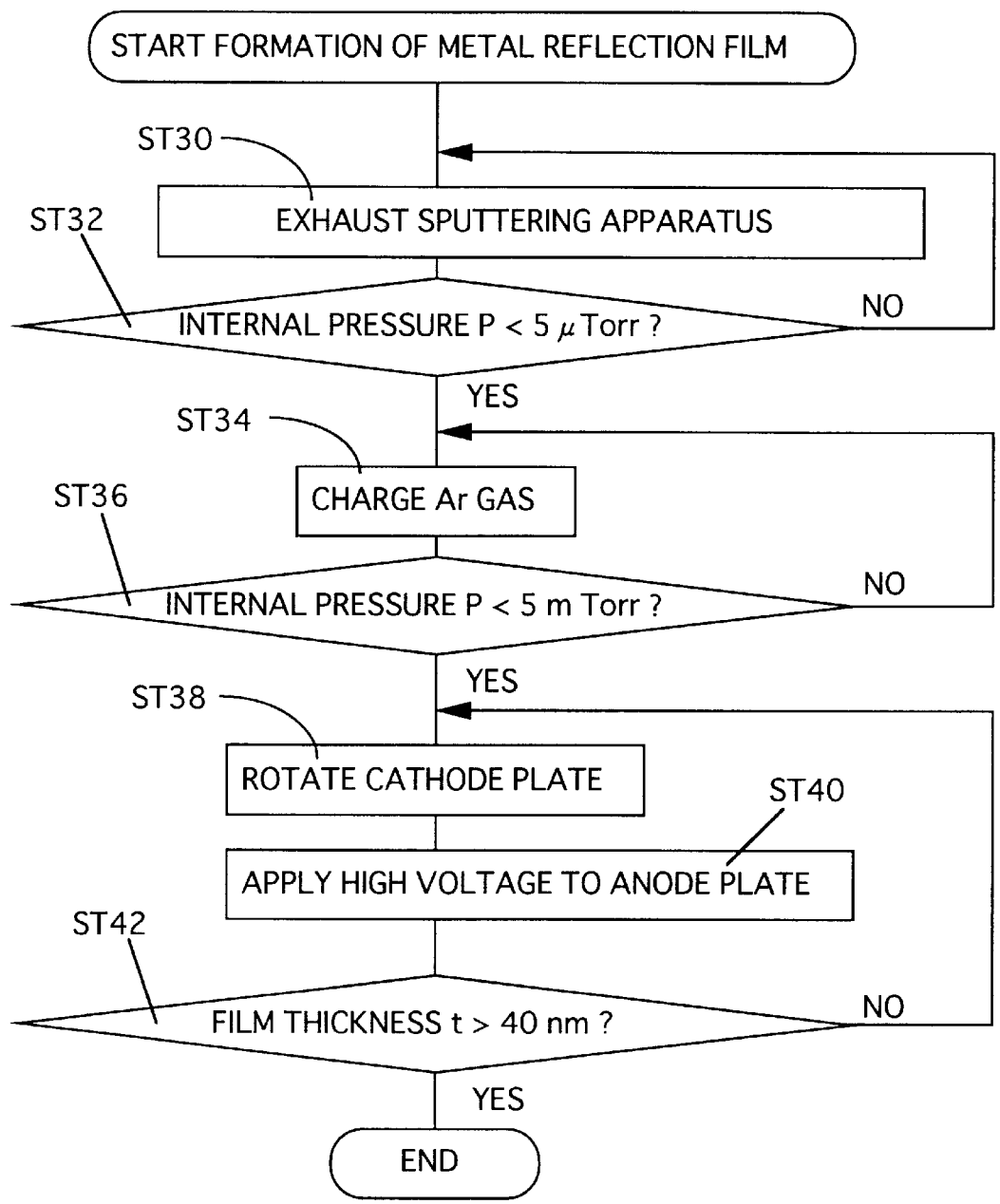
FIG. 14 is a flow chart for explaining the sequence for forming second information recording layer 20 (an aluminum-molybdenum thin film) for the double-layered optical disk by using the apparatus shown in FIG. 7.

FIG. 14 is a flow chart for explaining a sequence for forming second information recording layer 20 for double-layered optical disk OD using the apparatus shown in FIGS. 7 and 8. A program corresponding to this sequence can be executed by the CPU in sputtering controller 120 in FIG. 7.

Controller 120 operates the exhaust apparatus (1141 to 1143) to exhaust vacuum vessel 100 to 5 $\mu$Torr or less while monitoring the internal pressure of vacuum vessel 100 using internal pressure sensor 108 (step ST30 and NO in step ST32). Controller 120 then controls the ON/OFF operation of control valve 118 while monitoring the internal pressure of vacuum vessel 100 using internal pressure sensor 108, thereby supplying argon gas to vacuum vessel 100 at a pressure of 5 mTorr or less (step ST34 and NO in step ST36).

Sputtering aluminum (Al) (or an aluminum-molybdenum (Al—Mo)) is started using the supplied low-pressure argon gas as a sputtering gas.

More specifically, controller 120 opens shutter 1034 to rotate cathode plate 102 on which substrate 40 is mounted (step ST38). At the same time, while anode plate 1054 on which a target material of Al (or Al—Mo) is placed is rotated, a predetermined RF power is applied to the sputtering source (e.g., aluminum-molybdenum (Al—Mo)) for a predetermined period of time (step ST40) in a layer structure order (aluminum (Al) and then molybdenum (Mo)) to form second information recording layer 20 having a predetermined thickness (e.g., about 100 nm ±30%) (YES in step ST42).

In the above embodiment, up-sputtering is exemplified in which substrate 40 is disposed above the target material. However, side-sputtering may be employed in which substrate 40 is located besides a target material.

A sputtering method using the apparatus shown in FIG. 7 is exemplified, but layer 20 may be formed by vacuum deposition.

Figure 15:
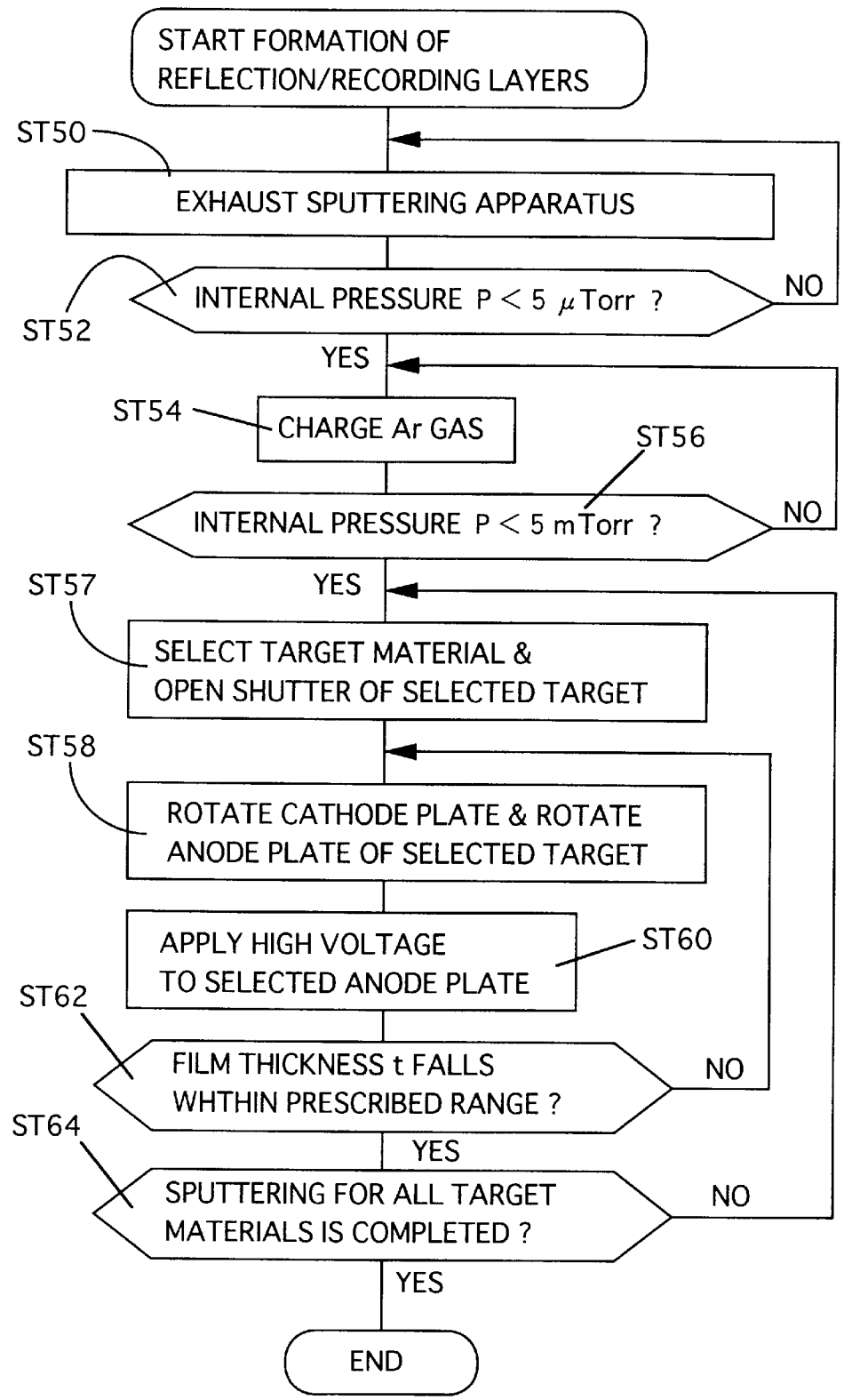
FIG. 15 is a flow chart for explaining the sequence for forming recording layers (90 to 94) and a reflection layer (20) on one substrate 40 for the double-layered optical disk by using the apparatus shown in FIG. 7.

FIG. 15 is a flow chart for explaining a sequence for forming recording layers (90 to 94) and reflection layer (20) on substrate 40 for read/write double-layered optical disk OD using the apparatus shown in FIGS. 7 and 8. A program corresponding to this sequence is also executed by the CPU in sputtering controller 120 in FIG. 7.

Controller 120 operates the exhaust apparatus (1141 to 1143) to exhaust vacuum vessel 100 to 5 $\mu$Torr or less while monitoring the internal pressure of vacuum vessel 100 using internal pressure sensor 108 (step ST50 and NO in step ST52). Controller 120 then controls the ON/OFF operation of control valve 118 while monitoring the internal pressure of vacuum vessel 100 using internal pressure sensor 108, thereby supplying argon gas to vacuum vessel 100 at a pressure of 5 mTorr or less (step ST54 and NO in step ST56).

(1) Sputtering aluminum (Al) serving as a target material is started using the supplied low-pressure argon gas as a sputtering gas.

More specifically, controller 120 opens shutter 1034 above anode plate 1054 on which the target material of aluminum (Al) is placed, while remaining shutters 1031, 1032, and 1033 are kept closed (step ST57).

Controller 120 applies a predetermined RF power to the sputtering source (aluminum (Al)) for a predetermined period of time (step ST60) while rotating cathode plate 102 on which substrate 40 is mounted and anode plate 1054 on which the target material of aluminum (Al) is placed (step ST58), thereby forming laser reflection layer 20 having a predetermined thickness (e.g., a center value of 100 nm) (YES in step ST62). Of all the thin films to be formed on substrate 40, formation of thin film 20 is ended (YES in step ST62; NO in step ST64).

(2) Subsequently, sputtering a mixture of ZnS and $SiO_2$ as a target material is started using as a sputtering gas a low-pressure argon gas controlled to a pressure of 5 mTorr or less.

More specifically, controller 120 opens only shutter 1032 above anode plate 1052 on which the target material of ZnS.$SiO_2$ is placed, while remaining shutters 1031, 1033, and 1034 are kept closed (step ST57).

Controller 120 applies a predetermined power to the sputtering material (ZnS.$SiO_2$) for a predetermined period of time (step ST60) while rotating cathode plate 102 on which substrate 40 is mounted and anode plate 1052 on which the target material ZnS.$SiO_2$ is placed (step ST58), thereby forming ZnS.$SiO_2$ layer 94 having a predetermined thickness (e.g., a center value of 20 nm) (YES in step ST62). Of all the thin films to be formed on substrate 40, formation of second thin film 94 is ended (YES in step ST62; NO in step ST64).

(3) Subsequently, sputtering $Ge_2Sb_2Te_5$ as a target material is started using as a sputtering gas a low-pressure argon gas controlled to a pressure of 5 mTorr or less.

More specifically, controller 120 opens only shutter 1033 above anode plate 1053 on which the target material of $Ge_2Sb_2Te_5$ is placed, while remaining shutters 1031, 1032, and 1034 are kept closed (step ST57).

Controller 120 applies a predetermined power to the sputtering material ($Ge_2Sb_2Te_5$) for a predetermined period of time (step ST60) while rotating cathode plate 102 on which substrate 40 is mounted and anode plate 1053 on which the target material ($Ge_2Sb_2Te_5$) is placed (step ST58), thereby forming $Ge_2Sb_2Te_5$ layer 90 having a predetermined thickness (e.g., a center value of 20 nm) (YES in step ST62). Of all the thin films to be formed on substrate 40, formation of third thin film 90 is ended (YES in step ST62; NO in step ST64).

(4) Finally, sputtering a mixture of ZnS and $SiO_2$ as a target material is started using as a sputtering gas a low-pressure argon gas controlled to a pressure of 5 mTorr or less.

More specifically, controller 120 opens only shutter 1032 above anode plate 1052 on which the target material of ZnS.$SiO_2$ is placed, while remaining shutters 1031, 1033, and 1034 are kept closed (step ST57).

Controller 120 applies a predetermined power to the sputtering material (ZnS.$SiO_2$) for a predetermined period of time (step ST60) while rotating cathode plate 102 on which substrate 40 is mounted and anode plate 1052 on which the target material ZnS.$SiO_2$ is placed (step ST58), thereby forming ZnS.$SiO_2$ layer 92 having a predetermined thickness (e.g., a center value of 180 nm) (YES in step ST62). Of all the thin films to be formed on substrate 40, formation of fourth thin film 92 is ended (YES in step ST62; YES in step ST64).

Double-layered optical disks formed by the method of FIGS. 13 to 15 using the apparatus shown in FIGS. 7 to 12 will be described by way of its examples (samples) below (in each embodiment described above, the thickness of transparent adhesive layer 50 is exemplified as 50 $\mu$m as the center value in the range of 55±15 $\mu$m, but in the following examples, the thickness of each transparent adhesive layer 50 is 40 $\mu$m as the lower limit value in the range of 55±15 $\mu$m).

EXAMPLE 1

In Example 1, first information recording layers 10 were formed using a metal thin film (e.g., gold (Au)) and an inorganic dielectric (e.g., Si). These layers will be referred to as samples A and B, respectively.

A polycarbonate substrate (refractive index: 1.6) having a diameter of 120 mm and a thickness of 0.6 mm was prepared. According to the DVD disk standard introduced in the "Prior Art", information having a capacity of less than 5 Gbytes is recorded on one face of a double-layered optical disk. In this example, for the sake of performance evaluation of a disk, embossed signals were recorded in advance at a single frequency (4 MHz) corresponding to the densest pattern for attaining this capacity.

Of these two substrates, substrate 40 was set on rotating base 102 in the sputtering apparatus in FIG. 7.

Exhaust valve 1143 was fully opened, and vacuum vessel 100 was exhausted to a vacuum of 1 $\mu$Torr using rotary pump 1141 and cryo pump 1142. Valve 117 of Ar gas cylinder 116 and inlet valve 119 of vacuum vessel 100 were opened to supply argon gas to vacuum vessel 100. In this case, the flow rate of argon gas (Ar gas) was regulated to 20 SCCM (20 CC/min) by gas flow controller or control valve 118. Exhaust valve 1143 is then opened half, and the argon (Ar) gas pressure in vacuum vessel 100 was set to 0.6 Torr (in this case, the gas pressure was higher than that exemplified in step ST36 of FIG. 14).

Motor 110 was then turned on to rotate rotating base 102. Switch 111 was set on the anode plate 1054 side, 13.56-MHz RF power supply 112 was turned on, and a 400-W RF power was supplied to anode plate 1054, thereby starting sputtering for the target of aluminum (Al) using argon (Ar) gas.

A circuit matching state was controlled to allow the plasma of argon (Ar) gas to sputter the aluminum (Al) target surface. Sputtering was performed for about 2 min to remove oxygen and impurities attached to the aluminum (Al) target surface. Shutter 1034 was then moved in a direction of an arrow (open state) to start film formation of aluminum (Al) on disk substrate 40. When about two minutes had elapsed, RF power supply 112 was turned off to stop sputtering, and shutter 1134 was closed. As a result, a 100-nm thick aluminum (Al) reflection film was formed on substrate 40.

The other substrate 30 was then set on rotating base 102 in the sputtering apparatus in FIG. 7 in the same manner as described above. The target was replaced with gold (Au) in advance. Gold (Au) semi-transparent film 10 was formed following the same procedures as in aluminum (Al). In this case, the conditions were different from the case of Al (aluminum) in that the RF power was set to 100 W and the film formation time was set to 20 sec, and a 12-nm gold (Au) film was formed.

Substrate 30 on which gold (Au) semi-transparent film 10 was formed was set in spinner 800 shown in FIG. 9. UV resin solution 220 was poured from dispenser 250 to gold (Au) semi-transparent film 10 while rotating spinning table 200 at a low speed of 20 rpm. As shown in FIG. 11, substrate 40 was placed on substrate 30 such that the aluminum (Al) reflection surface of substrate 40 was in contact with UV resin solution 220. The speed of spinning table 200 was increased to 500 rpm, and high-speed rotation was continued for about 2 min, thereby uniformly spin-coating UV resin solution 220 between substrates 30 and 40.

Figure 12:
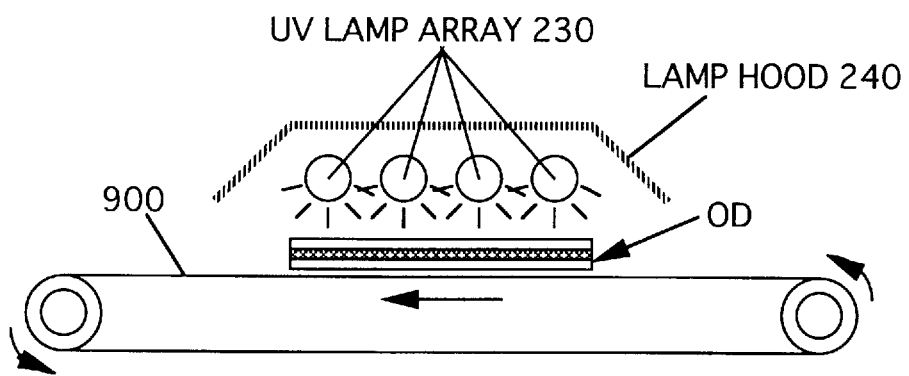
FIG. 12 is a view for explaining an ultraviolet irradiation step of curing the adhesive layer (ultraviolet curing resin 50) of the double-layered optical disk (OD) formed by the apparatus in FIGS. 9 to 11.

After this spin coating, the double-layered disk of substrates 30 and 40 was set on belt conveyor 900 of the UV irradiation apparatus shown in FIG. 12. A 2-kW ultraviolet beam from UV lamp array 230 was irradiated from the substrate 30 side on which Au semi-transparent film 10 was formed, thereby curing UV resin solution 220 between the substrates. A disk sample (layer 10 was the gold (Au) thin film) double-layered in the above sequence is defined as "sample A-1" used for relative evaluation of the present invention.

In the same sputtering as described above, aluminum (Al) reflection film 20 was formed on substrate 40 of two polycarbonate substrates (embossed signals were recorded at a single frequency of 4 MHz as in "sample A-1") each having a diameter of 120 mm, a thickness of 0.6 mm, and a refractive index of 1.6.

The other substrate 30 was placed in the sputtering apparatus. Once the sputtering apparatus was evacuated to a vacuum, argon (Ar) gas is supplied to the sputtering apparatus, and sputtering using as a target an inorganic dielectric material having a high refractive index (Si having a refractive index of 4) was performed. By this sputtering, Si film 10 having a thickness of about 80 nm was formed. During Si film formation, the RF power was set to 400 W, and sputtering was performed for 3 min and 30 sec. These two substrates 30 and 40 were adhered with a UV resin layer having a thickness of 40 $\mu$m as in "sample A-1".

A disk sample (layer 10 was the Si thin film) having the structure in FIG. 3 obtained by the above adhesion procedure is defined as "sample B-1" of Example 1 of the present invention.

A free fall test was conducted such that the resultant "sample A-1" and "sample B-1" were dropped on a concrete floor from heights of 30 cm, 50 cm, 70 cm, and 100 cm from the floor. As a result, the substrates of "sample A-1" peeled in the free fall test from the height of 30 cm. According to "sample B-1" of Example 1 did not peel in the free fall test from the height of 100 cm.

Each of two samples disks A-1 and B-1 was loaded in the disk evaluation drive apparatus shown in FIG. 5 to perform performance evaluation. Since the embossed pits were formed in the two substrates (30 and 40) of these two disks at the single carrier frequency of 4 MHz, these signals were read, and C/N ratios (Carrier-to-Noise ratios) of the 4-MHz read signals were measured by spectrum analyzer 620.

Disk OD of "sample A-1" was set in the evaluation drive of FIG. 5, and spindle motor 210 was controlled to obtain a constant linear speed of 3.6 m/s at each radial position. Continuous read light (read laser beam RL) having a power of 1 mW was irradiated from optical head 600, and the reflected beams was amplified by pre-amplifier 616. The amplified reflected beam signal was digitized by digitizer 618, and the C/N ratio of the digital signal was measured by spectrum analyzer 620. A C/N ratio of 58 dB was obtained when the laser beam was focused on aluminum (Al) reflection surface 20 of "sample A-1".

A measurement was then similarly performed when the laser beam was focused on gold (Au) semi-transparent film 10 of "sample A-1" to obtain a C/N ratio of 51 dB. It was thus found an increase in noise. This increase may be caused by island-like gold (Au) clusters attached to substrate 30, which may be measured as noise.

C/N ratios were similarly measured to be 60 dB and 59 dB, respectively, when the laser beam was focused on aluminum (Al) reflection surface 20 and Si dielectric film 10 of "sample B-1". That is, in reading recorded information of layer 10 of "sample B-1", unlike "sample A-1", noise was not increased. A read C/N ratio of layer 20 was higher than that of "sample A-1".

In another measurement, reflectance R was figured out to be about 28% from an amount of laser beam reflected when the laser beam was focused on gold (Au) semi-transparent film 10 of "sample A-1". The same measurement as described above was performed for Si dielectric film 10 of "sample B-1" to obtain a reflectance of 23%. It was confirmed that an appropriate amount of reflected beam was obtained although Si layer 10 was transparent to the laser beam because Si layer 10 had a high refractive index.

Note that reflectance R is 40% or more from the film thickness of 80 nm in the graph of FIG. 6, but reflectance R of 23% was obtained in the measurement result of Example 1 due to variations in film thicknesses. FIG. 6 shows the results obtained by theoretically calculating changes in reflectance. The loss and errors of the actual products are not considered in these results in FIG. 6. For example, when the thickness of Si film 10 varies in the range of 60 to 100 nm, reflectance R decreases to 20 to 30% judging from the graph in FIG. 6.

EXAMPLE 2

A structure of Example 2 was the same as that of Example 2 except that adhesive layer 50 was not formed of a UV resin having a thickness of 40 μm but of a transparent double-coated tape having a thickness of 40 μm. Disks having layers 10 constituted by a 12-nm gold (Au) thin film and an 80-nm thick Si thin film are defined as "sample A-2" and "sample B-2", respectively.

The double-coated tape was compression-bonded at a reduced pressure to prevent mixing of bubbles during adhesion. A free fall test was conducted for these two sample disks following the same procedures as in Example 1. The substrates of "sample A-2" peeled in the free fall test from the height of 30 cm, while the substrates of "sample B-2" did not peel in the free fall test from the height of 100 cm.

EXAMPLE 3

A sample was manufactured in the same structure (FIG. 3) as in Example 1 except that $TiO_2$ having a refractive index of 2.2 was used in place of Si as inorganic dielectric film 10 having a high refractive index. This sample is defined as "sample C".

A free fall test was conducted for "sample C" in the same manner as in Example 1, and no peeling was found in "sample C" in the free fall test from the height of 100 cm.

A C/N ratio of "sample C" was measured following the same procedures as in Example 1 using the disk evaluation drive in FIG. 5. As a result, the C/N ratios were measured to be 60 dB and 57 dB, respectively, when the laser beam was focused on aluminum (Al) reflection face 20 and TIO2 dielectric face 10. The C/N ratio of the light reflected by $TiO_2$ face 10 was slightly lower than that by Si film 10 because it may be assumed that the reflectance is 20% lower than that of Si when the laser beam is focused on $TiO_2$.

In the above description, the two faces of double-layered optical disk OD are those of a read ROM disk. However, as shown in FIG. 4, write, erase, or overwrite enable recording film 90 may be formed at reflection film 20. In this case, there can be obtained a double-layered optical disk in which a laser beam is focused on inorganic dielectric film 10 to read ROM information, and a laser beam is focused on recording film 90 to perform a write operation or a write, erase, and overwrite operation. With this structure, the same effect as described above (a high C/N ratio and the substrates constituting the disk can hardly peel) can be expected using inorganic dielectric film 10 having a high refractive index. Such an example will be described below.

EXAMPLE 4

A double-layered optical disk having the structure shown in FIG. 4 was manufactured. That is, an 80-nm thick Si film was formed as inorganic dielectric film 10 as in Example 1 for substrate 30 in which embossed pit signals of the densest pattern were recorded at a single frequency of 4 MHz. No embossed pit signals were recorded in the other substrate 40, and a continuous groove was formed in place of the embossed pit signals. Substrate 40 was set on rotating base 102 in the sputtering apparatus in FIG. 7. Si, $ZnS.SiO_2$, a $Ge_2Sb_2Te_5$ alloy, and aluminum (Al) were set as target materials on anode plates 1051 to 1054 in vacuum vessel 100, respectively.

Exhaust valve 1143 was fully opened, and vacuum vessel 100 was exhausted to a vacuum of 1 μTorr using rotary pump 1141 and cryo pump 1142. Valve 117 of Ar gas cylinder 116 and inlet valve 119 of vacuum vessel 100 was opened to supply argon gas to vacuum vessel 100. In this case, the flow rate of argon gas (Ar gas) was regulated to 20 SCCM (20 CC/min) by gas flow controller or control valve 118. Exhaust valve 1143 is then opened half, and the argon (Ar) gas pressure in vacuum vessel 100 was set to 0.6 Torr.

Motor 110 was then turned on to rotate rotating base 102. Switch 111 was set on the anode plate 1054 side, a 13.56-MHz 400-W RF power was applied to the aluminum (Al) target. After pre-sputtering for about 2 min, shutter 1034 is opened to form a 100-nm aluminum (Al) reflection film 20 on substrate 40 for a total of 2 min.

To remove radicals of aluminum (Al) once from vacuum vessel 100, valve 119 was closed, and valve 1143 was fully opened. The interior of vacuum vessel 100 was set in a reduced pressure to a vacuum of 10 μTorr again. Valve 119 was opened to supply argon (Ar) gas to vacuum vessel 100. Exhaust valve 1143 was opened half to regulate the internal pressure of vacuum vessel 100 to 0.6 Torr. Switch 111 was then set on the anode plate 1052 side to turn on RF power supply 112 to apply a 200-W power to the $ZnS.SiO_2$ target. After pre-sputtering for about 2 min, shutter 1032 was opened. After 30 sec, RF power supply 112 was turned off to form 20-nm thick $ZnS.SiO_2$ film 94 on aluminum (Al) film 20.

Valve 119 was closed again, and exhaust valve 1143 was fully opened to purge the $ZnS.SiO_2$ radicals from vacuum vessel 100. Valve 119 was opened again to supply argon (Ar) gas to vacuum vessel 100, and the pressure was set to 0.6 Torr. Switch 111 was then set on the anode plate 1053 side to apply a 100-W RF power to the $Ge_2Sb_2Te_5$ target. After pre-sputtering for about 2 min, shutter 1033 is opened to form 20-nm thick $Ge_2Sb_2Te_5$ phase change recording film 90 on $ZnS.SiO_2$ film 94 for a total of 1 min.

Valve 119 was closed again, and exhaust valve 1143 was fully opened. The $Ge_2Sb_2Te_5$ radicals were purged from vacuum vessel 100. As in the previous process, ZnSySiO was sputtered again. After sputtering for 4 min and 30 sec, RF power supply 112 was turned off to form 180-nm thick $ZnS.SiO_2$ film 92 on $Ge_2Sb_2Te_5$ recording film 90.

Substrates 30 and 40 thus prepared were adhered to each other through 40-fm thick UV adhesive layer 50 such that inorganic dielectric film 10 faced phase change recording film 90 as in Example 1. The resultant disk sample is defined as "sample D".

This "sample D" disk was loaded in the disk evaluation drive in FIG. 5 to perform the following evaluation.

Spindle motor 210 was controlled to obtain a constant linear speed of 3.6 m/s at each radial position. A laser beam was irradiated from optical head 600 and subjected to focus servo so that the laser beam was focused on phase change recording film 90. The laser beam was then subjected to intensity modulation in two stages, i.e., at a power of 10 mW for a write operation and a power of 4 mW for an erasing operation. Information was recorded at a single frequency of 4 MHz with a duty ratio of 50%.

A weak continuous read beam having a power of 0.8 mW was irradiated to read a signal recorded on phase change recording film 90, and the C/N ratio of the signal was measured to be 58 dB by spectrum analyzer 620. The C/N ratio was lower than those in the read operations for layers 20 in Examples 1 to 3 due to the following reason. As compared with the read operations for the embossed pits in Examples 1 to 3, the amplitude of a signal from the pit is slightly smaller than those in Examples 1 to 3 because a signal is detected by a change in reflectance between the amorphous portion of a recording mark and a surrounding crystalline portion ($ZnS.SiO_2$). This is not an essential problem in the present invention.

$ZnS.SiO_2$ dielectric film 10 was then subjected to focus servo to read a 4-MHz embossed pit signal recorded in advance, and the C/N ratio of the resultant signal was measured to be 59 dB, which was equal to that in Example 1. The same result for the free fall test as in Example 1 was also obtained (the substrates of the disk did not peel in the free fall test from the height of 1 m).

As described above, the double-layered optical disk of the present invention can be applied to a type in which substrate 40 having reflection film 20 attached thereto and substrate 30 having inorganic dielectric film 10 having a high refractive index and adhered thereto are adhered to each other through transparent organic adhesive layer 50, a light beam such as a laser beam is irradiated from substrate 30 on which inorganic dielectric film 10 is attached, and the light beam is focused on inorganic dielectric film 10 or reflection film 20 to read information from the focused face. In this double-layered optical disk, the substrates will not peel at a portion near the semi-transparent film and is free from a problem in which the C/N ratio of the read signal from this face is lowered due to variations in reflectance due to an excessively small thickness of the semi-transparent film. Therefore, a stable, high-quality read signal can be obtained.

Figure 16:
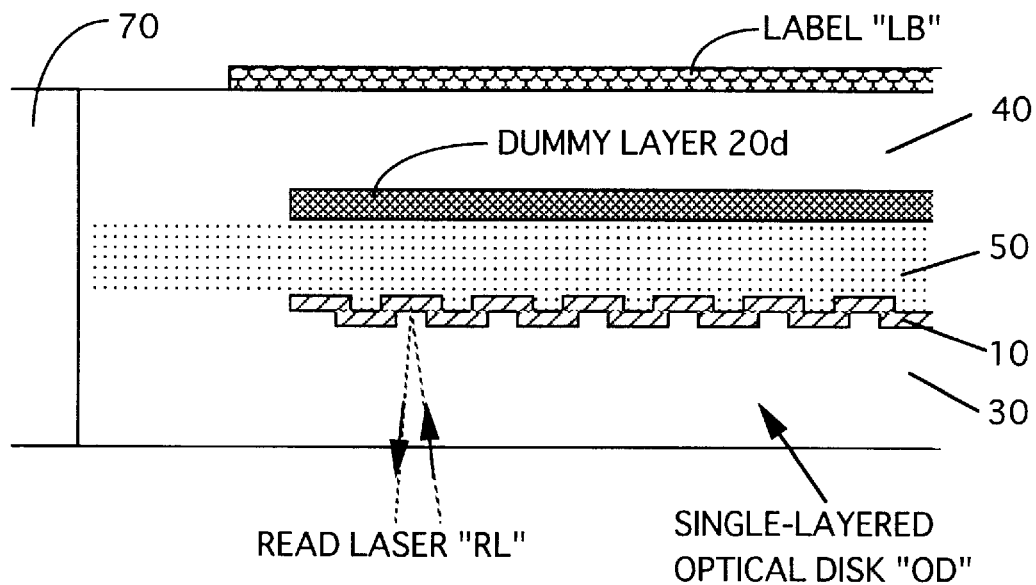
FIG. 16 is a view of a modification of FIG. 2, illustrating part of a section when the number of information recording layers of double-layered optical disk OD is one.

FIG. 16 shows a modification of one-face read type double-layered optical disk shown in FIG. 2 or 3. More specifically, FIG. 16 is a partial sectional view of double-layered optical disk OD in which the number of information recording layers is one.

In the modification of FIG. 16, information recording layer 20 in FIG. 2 or 3 is replaced with dummy layer 20d on which information will not be recorded. When a total data amount to be stored in disk OD falls within the capacity of information recording layer 10, the modification in FIG. 16 can be used (the recording capacity of about 5 Gbytes can be assured by only information recording layer 10). Dummy layer 20d can be constituted by an aluminum-based metal thin film of a predetermined information pattern (embossed pit signals) having no substantial contents (phase "a predetermined information pattern having no substantial contents" includes not only a case in which nothing is written, but also a case in which monotonous data of data "0" or "1" are written on the recording surface).

Figure 17:
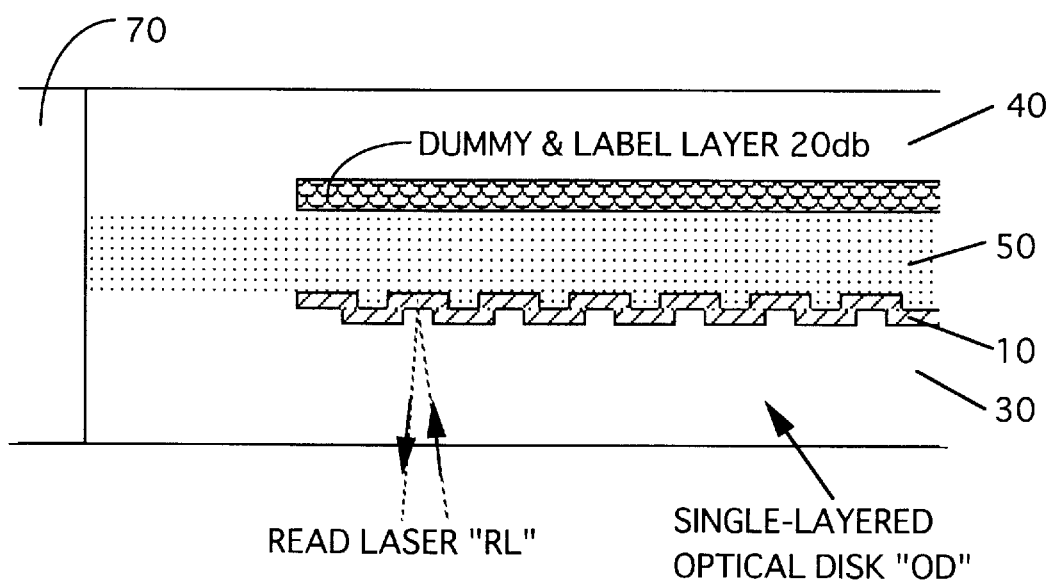
FIG. 17 is a view of another modification of FIG. 2, illustrating part of a section when the number of information recording layers of double-layered optical disk OD is one.

FIG. 17 is obtained by modifying the structure in FIG. 16. More specifically, FIG. 17 is a partial sectional view of double-layered optical disk OD in which the number of information recording layers is one.

In the modification of FIG. 17, information recording layer 20 in FIG. 2 or 3 is replaced with dummy & label layer 20 db. If optical disk OD is specified as a double-layered disk having one recording layer by reading part of information recording layer 10 first, a read apparatus for this disk OD can be initially set such that information access to dummy & label layer 20 db is not performed. In this case, since dummy & label layer 20 db need not reflect read laser beam RL, the material selection range for dummy & label layer 20 db can be widened. For example, a polycarbonate film on which a label pattern is printed can be used as dummy & label layer 20 db.

In the modification of FIG. 16 or 17, the thickness of dummy layer 20d or dummy & label layer 20 db need not be specifically managed. However, the thickness of substrate 40 including the thickness of dummy layer 20d or dummy & label layer 20 db is managed to a predetermined value (0.6 mm).

Figure 18:
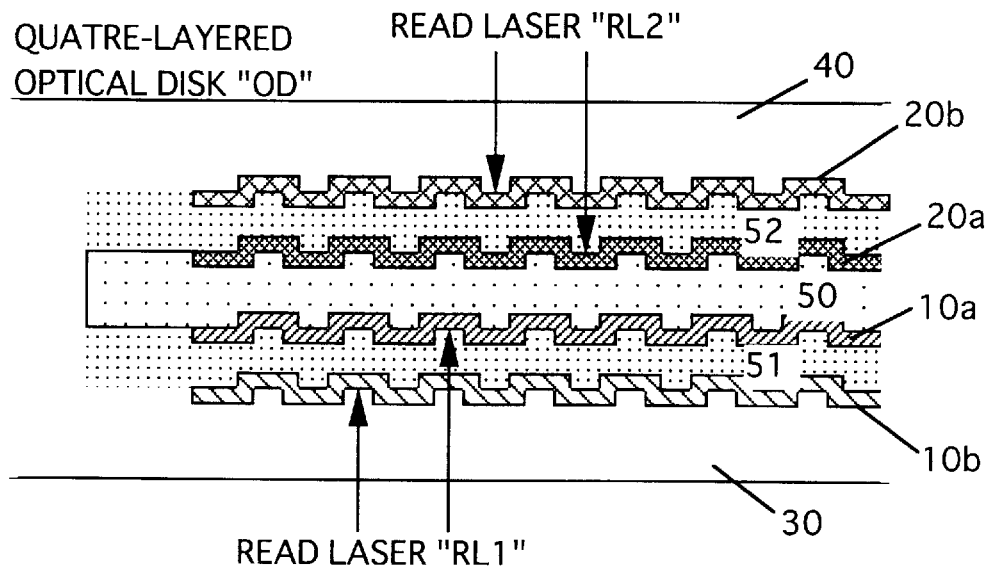
FIG. 18 is a view of still another modification of FIG. 2, illustrating part of a section when the number of information recording layers of double-layered optical disk OD is four.

FIG. 18 shows still another modification of a one-face read type double-layered disk in FIG. 2 or 3. More specifically, FIG. 18 is a partial sectional view of double-layered optical disk OD in which the number of information recording layers is four.

Information recording layer (aluminum (Al)) 10a (two-layered structure) is formed through ultraviolet curing resin layer 51 (this may be identical to adhesive 220 in FIG. 9) on substrate 30 having information recording layer (e.g., Si) 10b formed thereon. Information recording layer (e.g., aluminum (Al)) 20a (two-layered structure) is formed through ultraviolet curing resin layer 52 (adhesive 220) on substrate 40 having information recording layer (e.g., Si) 20b formed thereon. The layer 10a side of substrate 30 is adhered to layer 20a side of substrate 40 through adhesive layer 50 (adhesive 220).

In the modification of FIG. 18, information recording layers 10a and 10b are read-accessed with upward read laser beam RL1, while information recording layers 20a and 20b are read-accessed with downward read laser beam RL2.

Figure 19:
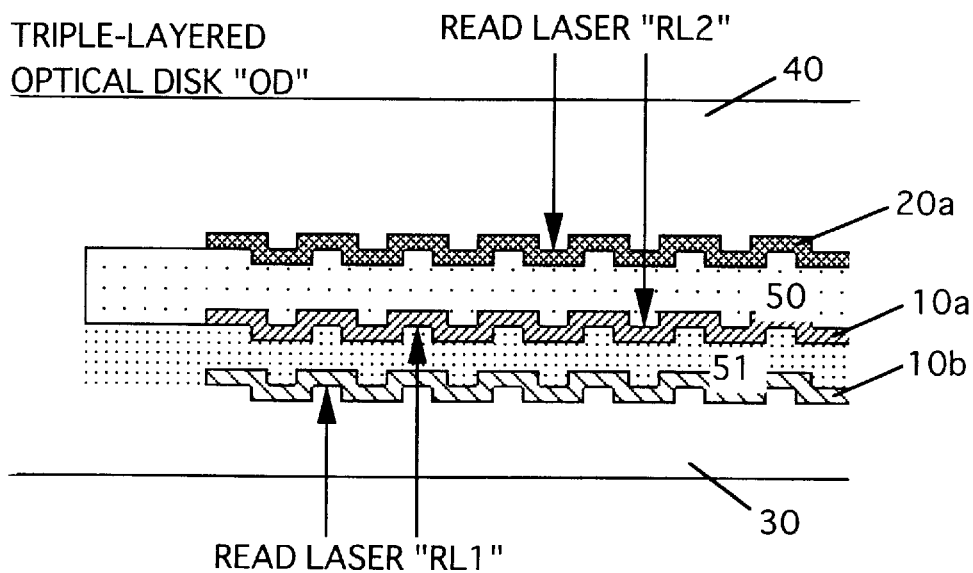
FIG. 19 is a view of still another modification of FIG. 2, illustrating part of a section when the number of information recording layers of double-layered optical disk OD is three.

FIG. 19 shows still another modification of a one-face read type double-layered disk in FIG. 2 or 3. More specifically, FIG. 19 is a partial sectional view of double-layered optical disk OD in which the number of information recording layers is three.

Information recording layer (e.g., aluminum (Al)) 10a (two-layered structure) is formed through ultraviolet curing resin layer 51 (adhesive 220) on substrate 30 having information recording layer (e.g., Si) 10b formed thereon, and information recording layer (e.g., Si) 20a (single-layered structure) is formed on substrate 40. The layer 10a side of substrate 30 and the layer 20a side of substrate 40 are adhered through adhesive layer 50 (adhesive 220).

In the modification of FIG. 19, information recording layers 10a and 10b are read-accessed with upward read laser beam RL1, while information recording layers 20a and 10a are read-accessed with downward read laser beam RL2.

FIGS. 20A to 20D are views showing the steps in manufacturing double-layered optical disk OD by adhering substrates 30 and 40 in a semi-disk state obtained through the steps in FIGS. 13 to 15. A description will be made under an assumption of a disk having the structure in FIG. 3.

Figure 20A:
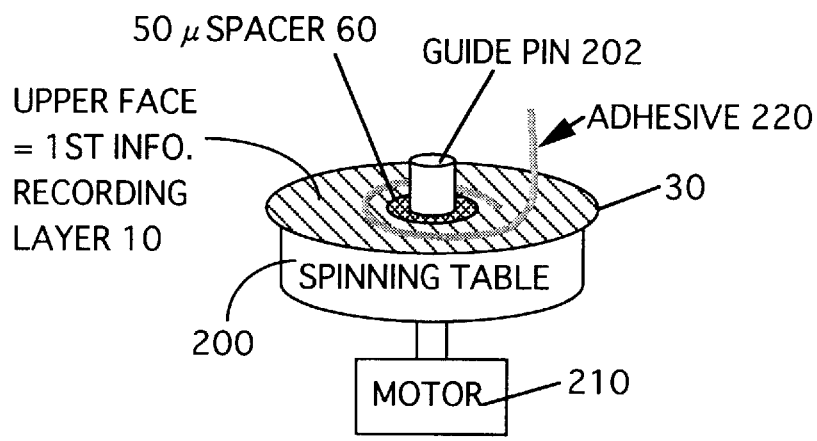
FIGS. 20A to 20D are views showing another method of manufacturing double-layered optical disk OD obtained by adhering semi-disk-like substrates 30 and 40 obtained in the steps in FIGS. 13 to 15.

In FIG. 20A, polycarbonate substrate (one half of double-layered optical disk OD) 30 was mounted on guide pin 202 of spinning table 200 such that first information recording layer (Si film) 10 faces upward. Film spacer 60 having a thickness of 40 μm is mounted on guide pin 202.

After substrate 30 is brought into tight contact with spinning table 200 and spacer 60 is brought into tight contact with substrate 30, ultraviolet curing adhesive 220 having a low viscosity is applied (or dripped) in an appropriate amount.

As adhesive 220, an ultraviolet curing adhesive, a thermosetting adhesive, or an anaerobic curing adhesive having a viscosity of 300 to 800 mPa.s (millipascalysec) is appropriate.

Figure 20B:
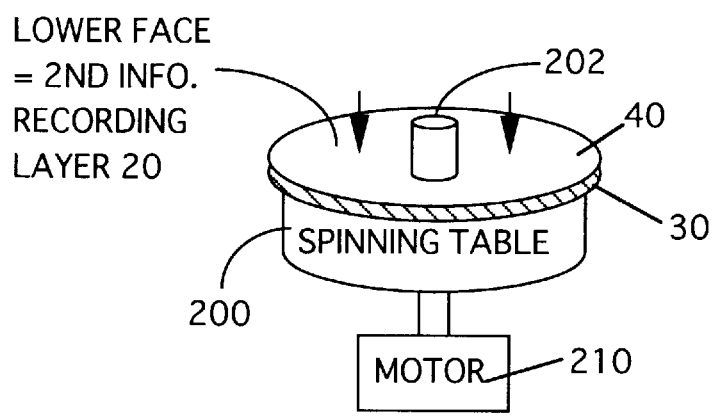

In FIG. 20B, immediately after adhesive 220 is applied or dripped in a predetermined amount, polycarbonate substrate (the other half of double-layered optical disk OD) 40 is mounted on guide pin 202 of spinning table 200 such that second information recording layer (an aluminum (Al) thin film or an aluminum-molybdenum (Al—Mo) alloy thin film) 20 faces downward. Substrate 40 is brought into contact with substrate 30 so as to spread adhesive 220 applied to substrate 30 (after substrates 30 and 40 are brought into tight contact, substrate 40 is not pressed against substrate 30 with an extra force).

At this time, there is a high possibility that bubbles (or small dust) in a thin film (prospective adhesive layer 50) are spread between substrates 30 and 40. The gap between substrates 30 and 40 is larger than the thickness (e.g., 50 $\mu$m) of spacer 60. There is a possibility that a small number of bubbles and dust may be present together with excessive adhesive 220 between the substrates.

Figure 20C:
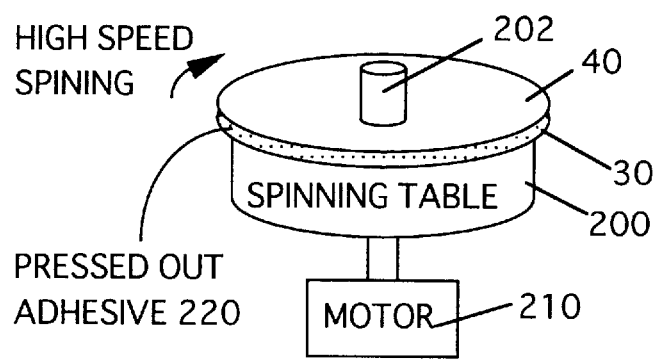

In FIG. 20C, after substrate 40 is brought into tight contact with substrate 30, spinning table 200 is rotated at a predetermined high speed (about 100 to 2,000 rpm; this speed need not be a constant speed, but can be a variable speed). Excessive adhesive 220 together with the bubbles, dust, and the like between substrates 30 and 40 are scattered by a centrifugal force during high-speed rotation.

When high-speed rotation continues for a predetermined period of time (about 10 sec; this value changes depending on conditions), the rotation speed of spinning table 200 is reduced to a low speed (e.g., about 6 rpm). At this time, adhesive layer 50 having an uniform thickness of 50 $\mu$m, free from bubbles, and regulated by the thickness of spacer 60 is left between substrates 30 and 40. A total thickness of substrates 30 and 40 is set to about 1.2 mm.

Figure 20D:
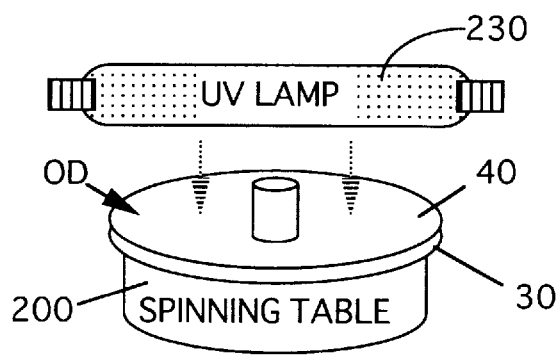

In FIG. 20D, double-layered optical disk OD in which adhesive layer 50 having a uniform thickness and free from bubbles is subjected to ultraviolet irradiation from ultraviolet lamp array 230. When ultraviolet irradiation continues for a predetermined period of time, adhesive 220 constituting layer 50 hardens to a practical strength. This makes it possible to perfectly integrate substrates 30 and 40, thereby finishing double-layered optical disk OD.

In the above process, the rotation speed of motor 210 rotated at a high speed, and its high-speed rotation period can be selected to values so as not to leave bubbles in adhesive layer 50 and to allow the thickness of adhesive layer 50 to fall within the range of 40 ±5 $\mu$m in accordance with an experiment using a plurality of samples.

The diameter of spinning table 200 is set to be slightly larger than the outer diameter (normally 120 mm or 80 mm) of optical disk OD to be manufactured. When the diameter of spinning table 200 is set smaller than the outer diameter of optical disk OD, adhesive 220 pressed out from the peripheral portion of double-layered optical disk OD can be prevented from flowing between disk OD and the table surface of spinning table 200.

More specifically, the diameter of spinning table 200 is set to fall within the range of, e.g., about 115 to 117 mm for double-layered optical disk OD having a diameter of 120 mm. The diameter of spinning table 200 is set to fall within the range of 75 to 77 mm for double-layered optical disk OD having a diameter of 80 mm.

Note that spacer 60 may be formed of a polymer film having, e.g., an inner diameter of 15 to 16 mm, an outer diameter of 20 to 21 mm, and a thickness of 50 $\mu$m.

If nothing is described on spacer 60, a polycarbonate film, a polyethylene terephthalate film, a polyimide film, or the like can be used as the polymer film used for this spacer 60. If label information is to be printed on spacer 60, a polycarbonate film is appropriate. To print information on spacer 60, the substantial thickness of spacer 60 upon printing must be managed to a desired thickness (e.g., 50 $\mu$m).

When the two substrates are adhered by the method of FIGS. 20A to 20D using spacer 60, the thickness (i.e., the optical path length of a laser beam passing through adhesive layer 50) of the adhesive layer 50 can be managed to the film thickness of spacer 60. When the thickness of film spacer 60 concentrically sandwiched between substrates 30 and 40 is given as 50 $\mu$m, adhesive layer 50 sandwiched between substrates 30 and 40 is automatically set to a predetermined thickness (about 50 ±5 $\mu$m) almost equal to the film thickness of 50 $\mu$m of spacer 60. To increase the thickness of adhesive layer 50, the film thickness of spacer 60 is increased accordingly.

In the one-face read type double-layered disk OD in FIG. 16 or 17, since a read operation is not performed from the second substrate 40 side, label LB can be disposed on the surface of substrate 40. In the structure shown in FIG. 18 or 19, since read access is performed from both faces of substrates 30 and 40, label Lb having a large area as shown in FIG. 16 or 17 cannot be disposed on disk OD.

In this case, by using transparent polycarbonate substrates 30 and 40, characters or a pattern associated with the recorded information of the disk may be printed on spacer 60 sandwiched between substrates 30 and 40. In this arrangement, the spacer 60 portion at the center of the disk can be used as a disk label although the visual information description amount is limited.

In either embodiment, the total thickness of double-layered optical disk OD is managed to 1.2 mm. For this reason, the thickness (about 0.6 mm or less) of substrate 30 (FIG. 18 or 19) having UV resin adhesive layer 51 is smaller than the thickness (about 0.6 mm) of substrate 30 having no adhesive layer 51 by the thickness (about 50 $\mu$m) of adhesive layer 51. Similarly, the thickness (about 0.6 mm or less) of substrate 40 (FIG. 18) having UV resin adhesive layer 52 is smaller than the thickness (about 0.6 mm) of substrate 40 having no adhesive layer 52 by the thickness (about 50 $\mu$m) of adhesive layer 52. In any case, the thickness of each of substrates 30 and 40 may be appropriately corrected in accordance with the contents of the embodiment.

According to an embodiment, an aluminum-molybdenum alloy thin film is used as second information recording layer 20. The present invention is not limited to this. A pure aluminum layer, a gold layer, or an alloy film of a refractory metal other than molybdenum (e.g., tungsten, tantalum, nickel, cobalt, platinum, chromium, or titanium) and aluminum, which is excellent in strength and antioxidation may be used in practice as second information recording layer 20 depending on application purposes of embodiments. Note that the material of first information recording layer 10 is limited to a transparent material (e.g., Si) having a higher refractive index than that of substrate 30.

According to the present invention, an inorganic dielectric material such as silicon is used to form first information recording layer (semi-transparent film) 10 so as to sufficiently assure a high interface adhesion strength with adhesive layer 50. An inorganic dielectric such as silicon is highly transparent to laser beam (wavelength: 650 nm) RL even if the dielectric has a certain thickness (e.g., 20 nm, 80 nm, or 160 nm) (see FIG. 6). Inorganic dielectric layer 10 made of silicon or the like has higher refractive index n than that of polycarbonate substrate 30 (n=4 for silicon with respect to n=1.6 for polycarbonate). For this reason, when a laser beam is focused on layer 10, laser beam RL is relatively largely reflected between substrate 30 and layer 10. The thickness of inorganic dielectric layer 10 is assured to some extent while the high adhesion strength of double-layered optical disk OD is assured, thereby simultaneously satisfying a high transparency and a high reflectance of layer 10.

According to the present invention, since the thickness of layer 10 can be made sufficiently thick, the substrates of a double-layered optical disk in which information can be read from two layers of one face can hardly peel in the presence of a dropping shock and a change over time.

Furthermore, according to the present invention, since layer 10 has a high transparency and a high reflectance with respect to a laser beam, the quality of reflected beam signals from the two information recording layers can be improved. That is, C/N ratios (Carrier-to-Noise) ratios of the reflected beam signals from the two recording information layers can be sufficiently high.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An information medium comprising:
    a first substrate having an information pit arranged to be read with a predetermined light beam and being transparent to the predetermined light beam;
    a first information recording layer formed on an information pit formation face of said first substrate and made of an inorganic dielectric having a higher refractive index than that of said first substrate; and
    a second substrate adhered to said first substrate through said first information recording layer.

2. An information recording medium comprising:
    a first substrate having a first information pit arranged to be read with a predetermined light beam and being transparent to the predetermined light beam;
    a first information recording layer formed on an information pit formation face of said first substrate and made of an inorganic dielectric having a higher refractive index than that of said first substrate;
    a second substrate having a second information pit arranged to be read with the light beam;
    a second information recording layer formed on an information pit formation face of said second substrate and made of a reflection material which reflects the light beam; and
    an adhesive layer for adhering said first substrate and said second substrate so that said first information recording layer faces said second information recording layer.

3. A medium according to claim 1 or 2, wherein said inorganic dielectric contains a material selected from the group consisting of silicon and titanium oxide.

4. A medium according to claim 1 or 2, wherein said inorganic dielectric has a thickness falling within a range of about 20 nm to about 1,000 nm.

5. A medium according to claim 1 or 2, wherein said second substrate has a reflection material which contains one material selected from the group consisting of aluminum and an aluminum-molybdenum alloy.

6. A medium according to claim 1 or 2, wherein said first substrate contains polycarbonate.

7. A medium according to claim 1 or 2, wherein said first substrate and said second substrate are made of polycarbonate disks each having a thickness of 0.6 mm.

8. A medium according to claim 1 or 2, wherein a thickness of said inorganic dielectric is selected on the basis of a ¼ wavelength of a wavelength of the light beam in said inorganic dielectric.

9. A medium according to claim 2, wherein said adhesive layer contains an ultraviolet curing resin having a thickness larger than the thickness of said inorganic dielectric.

10. A medium according to claim 2, wherein each of said first substrate and said second substrate has a disk-like shape having a hole and a predetermined outer diameter, a predetermined inner diameter, and a predetermined thickness,
    said medium further comprises a spacer having a specific outer diameter, a specific inner diameter, and a specific thickness and concentrically sandwiched between said first substrate and said second substrate, and
    said adhesive layer is present between said first substrate and said second substrate except a position of said spacer, and has a predetermined thickness defined by said spacer.

11. An information recording medium comprising:
    a transparent disk-like first substrate on which information is recorded as an embossed pit, said first substrate having a predetermined shape;
    an inorganic dielectric film formed on an embossed pit side of said first substrate and having a higher refractive index than that of said first substrate;
    a second substrate having generally the same shape as said first substrate; and
    an adhesive portion for adhering said first substrate and said second substrate so that said inorganic dielectric film faces said second substrate.

12. An information recording medium comprising:
    a transparent disk-like first substrate on which first information is recorded as an embossed pit;
    an inorganic dielectric film formed on an embossed pit side of said first substrate and having a higher refractive index than that of said first substrate;
    a disk-like second substrate on which second information is recorded as an embossed pit;
    a reflection film formed on an embossed pit side of said second substrate; and
    an adhesive portion constituted by a transparent organic material to adhere said first substrate and said second substrate so that said inorganic dielectric film faces said reflection film.

13. A medium according to claim 11 or 12, wherein said inorganic dielectric contains a material selected from the group consisting of silicon and titanium oxide.

14. A medium according to claim 11 or 12, wherein said inorganic dielectric has a thickness falling within a range of about 20 nm to about 1,000 nm.

15. An information recording medium comprising:
    a transparent disk-like first substrate on which first information is recorded as an embossed pit;
    an inorganic dielectric film formed on an embossed pit side of said first substrate and having a higher refractive index than that of said first substrate;
    a disk-like second substrate on which second information is recorded as an embossed pit;
    a recording film formed on an embossed pit side of said second substrate; and
    an adhesive portion made of a transparent organic material to adhere said first substrate and said second substrate so that said inorganic dielectric film faces said recording film.

16. A medium according to claim 15, wherein said inorganic dielectric contains a mixture of zinc sulfide and silicon oxide.

17. An information medium comprising:
a first substrate having an information pit arranged to be read with a predetermined light beam and being transparent to the predetermined light beam;
a first information recording layer formed on an information pit formation face of said first substrate and made of a material having a higher refractive index than that of said first substrate; and
a second substrate adhered to said first substrate through said first information recording layer.

18. An information recording medium comprising:
a transparent disk-like first substrate on which first information is recorded as an embossed pit;
a transparent film formed on an embossed pit side of said first substrate and having a higher refractive index than that of said first substrate;
a disk-like second substrate on which second information is recorded as an embossed pit;
a recording film formed on an embossed pit side of said second substrate; and
an adhesive portion made of a transparent organic material to adhere said first substrate and said second substrate so that said transparent film faces said recording film.

19. A medium according to claim 4, wherein said inorganic dielectric has a thickness falling within a range of 20 nm to 280 nm.

20. A medium according to claim 14, wherein said inorganic dielectric has a thickness falling within a range of 20 nm to 280 nm.

21. A medium according to claim 15, wherein said recording film is a write/read recording film.

22. A medium according to claim 15, wherein said recording film is a write/read/erase recording film.

23. A medium according to claim 15, wherein said recording film is an overwrite enable recording film.

24. A medium according to claim 18, wherein said recording film is a write/read recording film.

25. A medium according to claim 18, wherein said recording film is a write/read/erase recording film.

26. A medium according to claim 18, wherein said recording film is an overwrite enable recording film.

* * * * *